United States Patent [19]

Andreasen et al.

[11] Patent Number: 4,701,845
[45] Date of Patent: Oct. 20, 1987

[54] USER INTERFACE PROCESSOR FOR COMPUTER NETWORK WITH MAINTENANCE AND PROGRAMMABLE INTERRUPT CAPABILITY

[75] Inventors: David A. Andreasen, Newtown Square, Pa.; Jerrold E. Buggert, San Juan Capistrano, Calif.; Harshad K. Desai, Mission Viejo, Calif.; Zubair Hussain, Sunnyvale, Calif.

[73] Assignee: Unisys Corporation, Detroit, Mich.

[21] Appl. No.: 664,896

[22] Filed: Oct. 25, 1984

[51] Int. Cl.⁴ .................... G06F 11/22; G06F 13/34
[52] U.S. Cl. ................................. 364/200; 371/18
[58] Field of Search ... 364/200 MS File, 900 MS File; 371/16, 18

[56] References Cited

U.S. PATENT DOCUMENTS

| | | | |
|---|---|---|---|
| 3,838,260 | 9/1974 | Nelson | 371/16 |
| 4,030,075 | 6/1977 | Barlow | 364/200 |
| 4,091,455 | 5/1978 | Woods | 364/200 |
| 4,275,440 | 6/1981 | Adams | 364/200 |
| 4,334,307 | 6/1982 | Bourgeois | 364/200 |
| 4,630,224 | 12/1986 | Sollman | 364/550 |

OTHER PUBLICATIONS

*Intel Microprocessor and Peripherals Handbook*, (1983), pp. 3-1 to 3-11, 3-22–3-24.
*1984 Series 32000; Databook*, National Semiconductor Corp., pp. 338-353 (Published by National Semiconductor Corp., Santa Clara, CA).
*Counter/Firmware Technical Manual*, Published by Zilog, Campbell, CA 95008 (Mar. 1982) pp. 259-273, 281-298.
*Microprocessors and Microcomputer Development Systems* by Mohamed Rafiquzzaman, pp. 388-395.
*MCS 80/85 Family User's Manual*, Oct. 1979, by Intel Corp., pp. 6-68-73, 6-132-7, 6-140-9, 6-158-67, 6-178-85.

Primary Examiner—Gary V. Harkcom
Assistant Examiner—Lawrence E. Anderson
Attorney, Agent, or Firm—Alfred W. Kozak; Nathan Cass; L. Joseph Marhoefer

[57] ABSTRACT

A processor forms part of a computer network wherein the processor, designated as the User Interface Processor, operates to initialize and maintain and communicate to remote diagnostic terminals for purposes of confirming integrity of the system and also for finding the location of any faults or problems in the system. The User Interface Processor involves a microprocessor unit working in conjunction with a serial communications controller, random access memory and read only memory memories, a communications input/output (I/O) system, a multiple set of timer units and a priority interrupt controller. The User Interface Processor provides interfaces to a power control card unit, an I/O subsystem (of data link processors), and a remote terminal for diagnostic intercommunication.

11 Claims, 19 Drawing Figures

USER INTERFACE PROCESSOR BLOCK DIAGRAM.

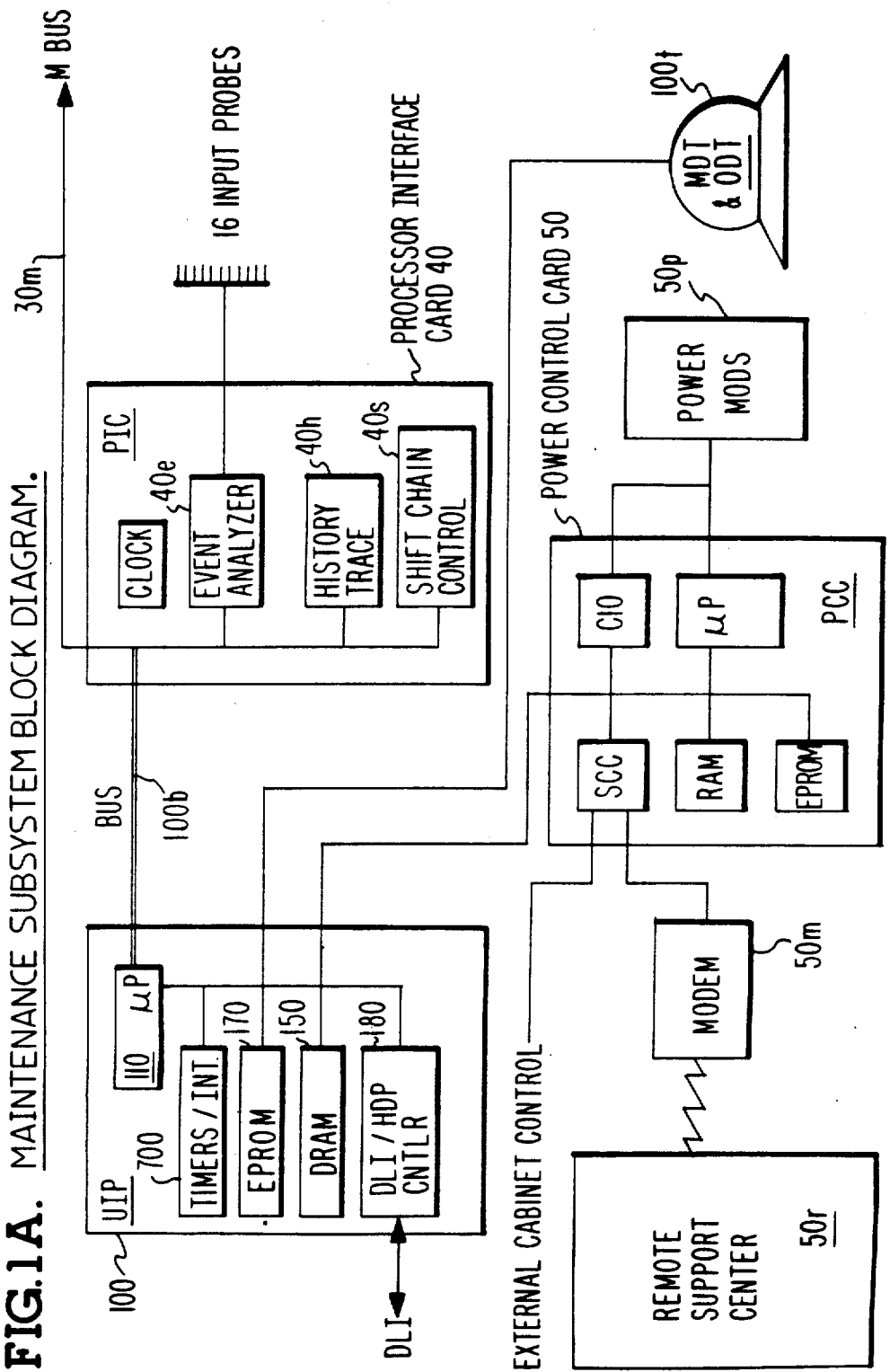
FIG.1A. MAINTENANCE SUBSYSTEM BLOCK DIAGRAM.

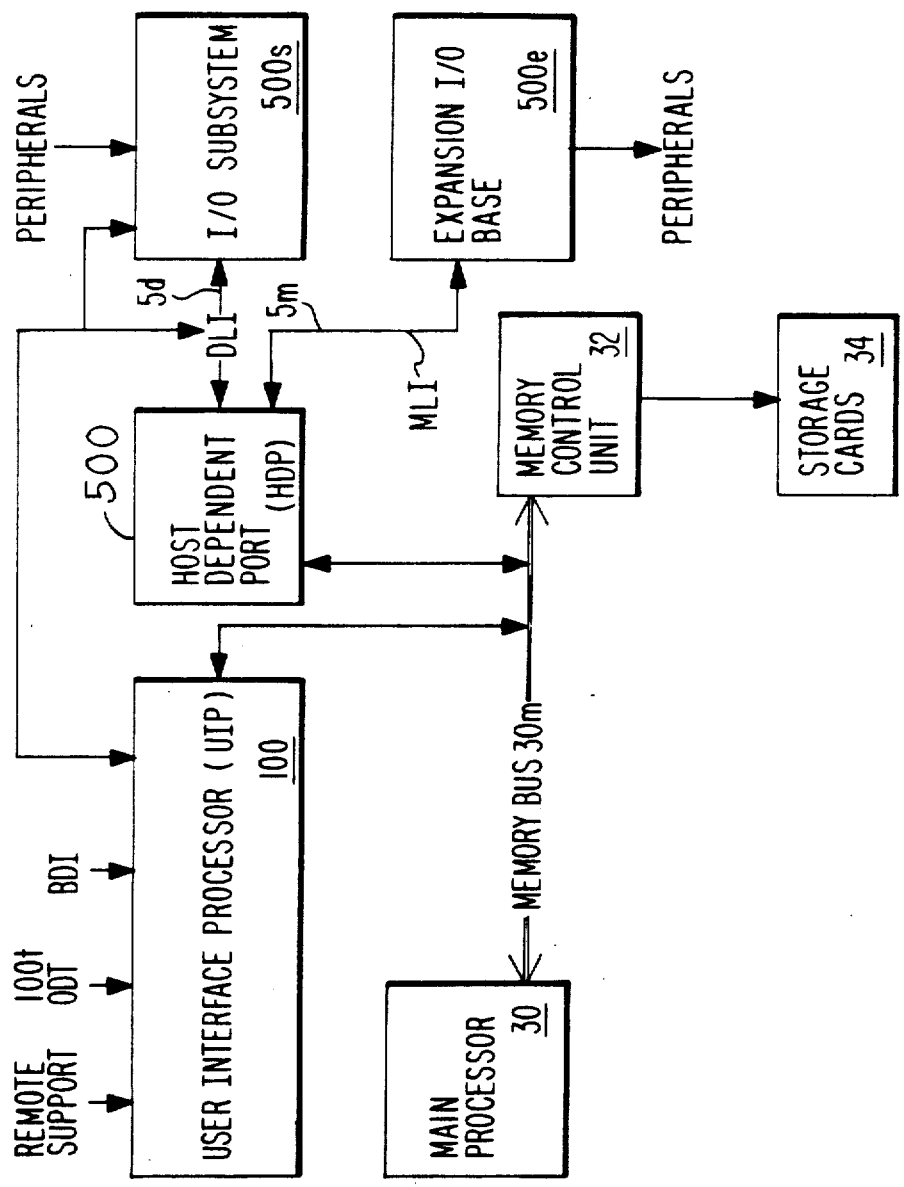
FIG. 1B. SYSTEM BLOCK DIAGRAM.

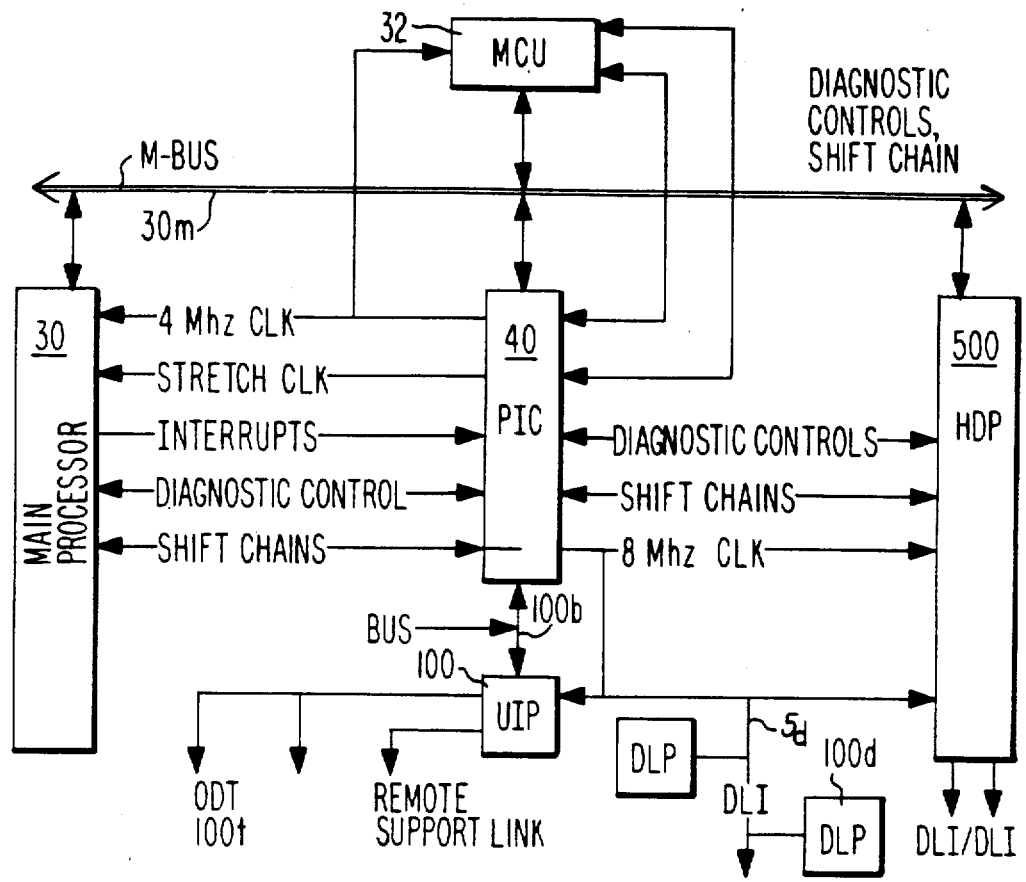
FIG. 1C. UIP AND SYSTEM MAINTENANCE INTERFACE.
LEGEND:
- UIP = USER INTERFACE PROCESSOR
- PIC = PROCESSOR INTERFACE CARD
- ODT = OPERATOR DISPLAY TERMINAL
- DLI = DATA LINK INTERFACE
- DLI/MLI = DATA LINK INTERFACE and/or MESSAGE LEVEL INTERFACE
- MCU = MEMORY CONTROL UNIT
- HDP = HOST DEPENDENT PORT

UIP I/O INTERFACE.

LEGEND:

PCT = PROCESSOR INTERFACE CARD
PCC = POWER CONTROL CARD
UIP = USER INTERFACE PROCESSOR
DLI = DATA LINK INTERFACE
BDI = BURROUGHS DIRECT INTERFACE
ODT = OPERATOR DISPLAY TERMINAL
MDT = MAINTENANCE DISPLAY TERMINAL
DLP = DATA LINK PROCESSOR

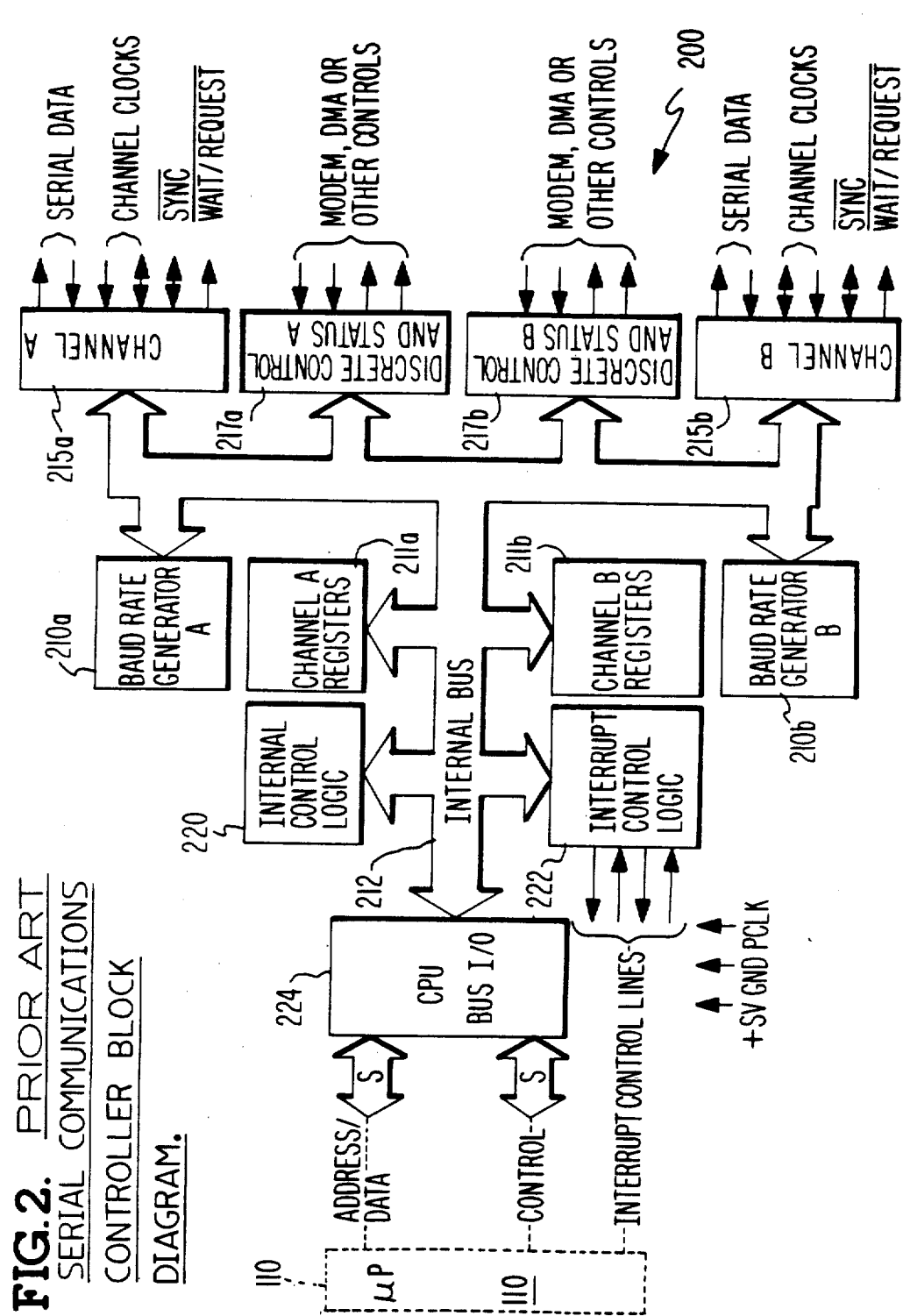
FIG.2. PRIOR ART SERIAL COMMUNICATIONS CONTROLLER BLOCK DIAGRAM.

SCC DATA PATHS.

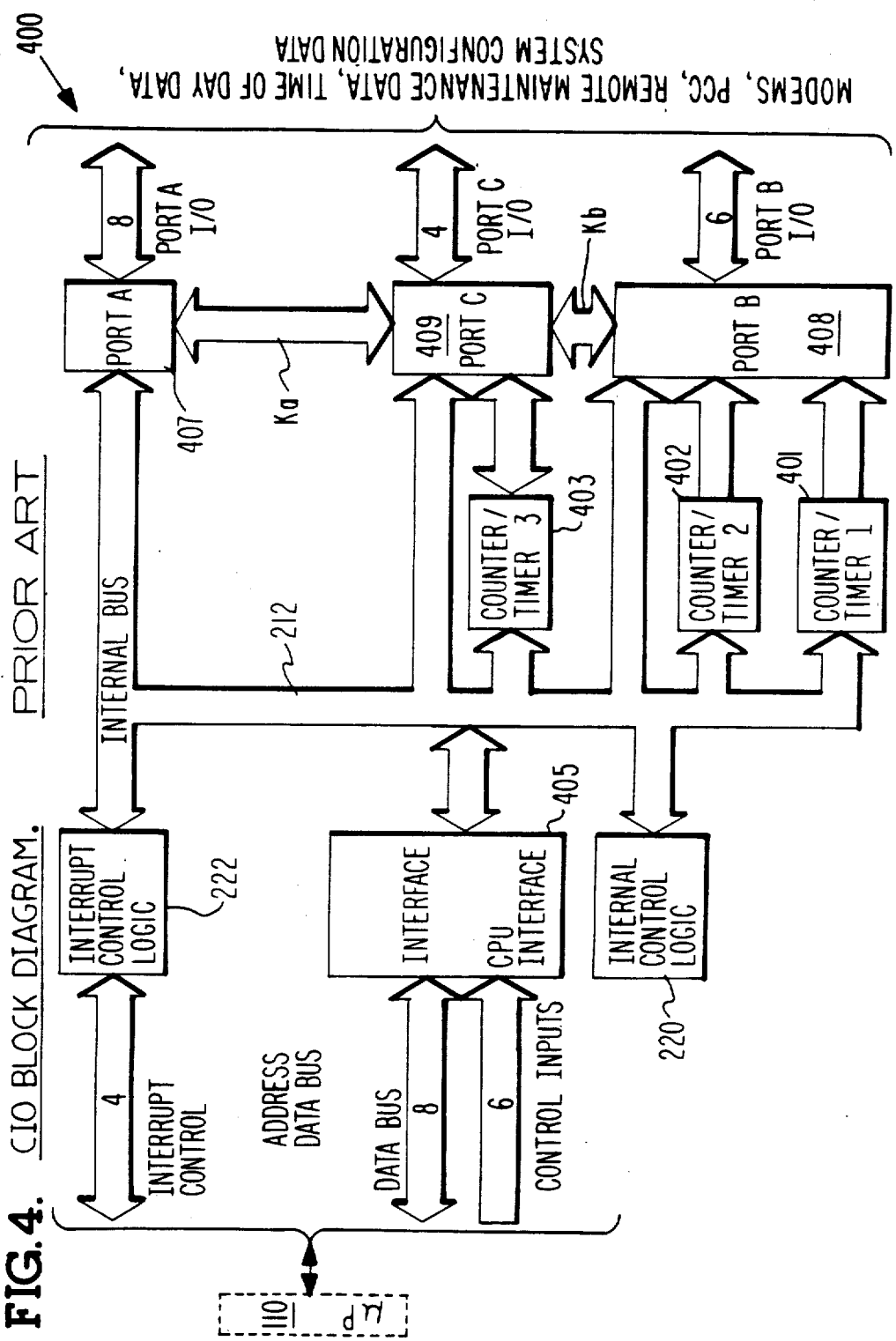
FIG. 4. CIO BLOCK DIAGRAM. PRIOR ART

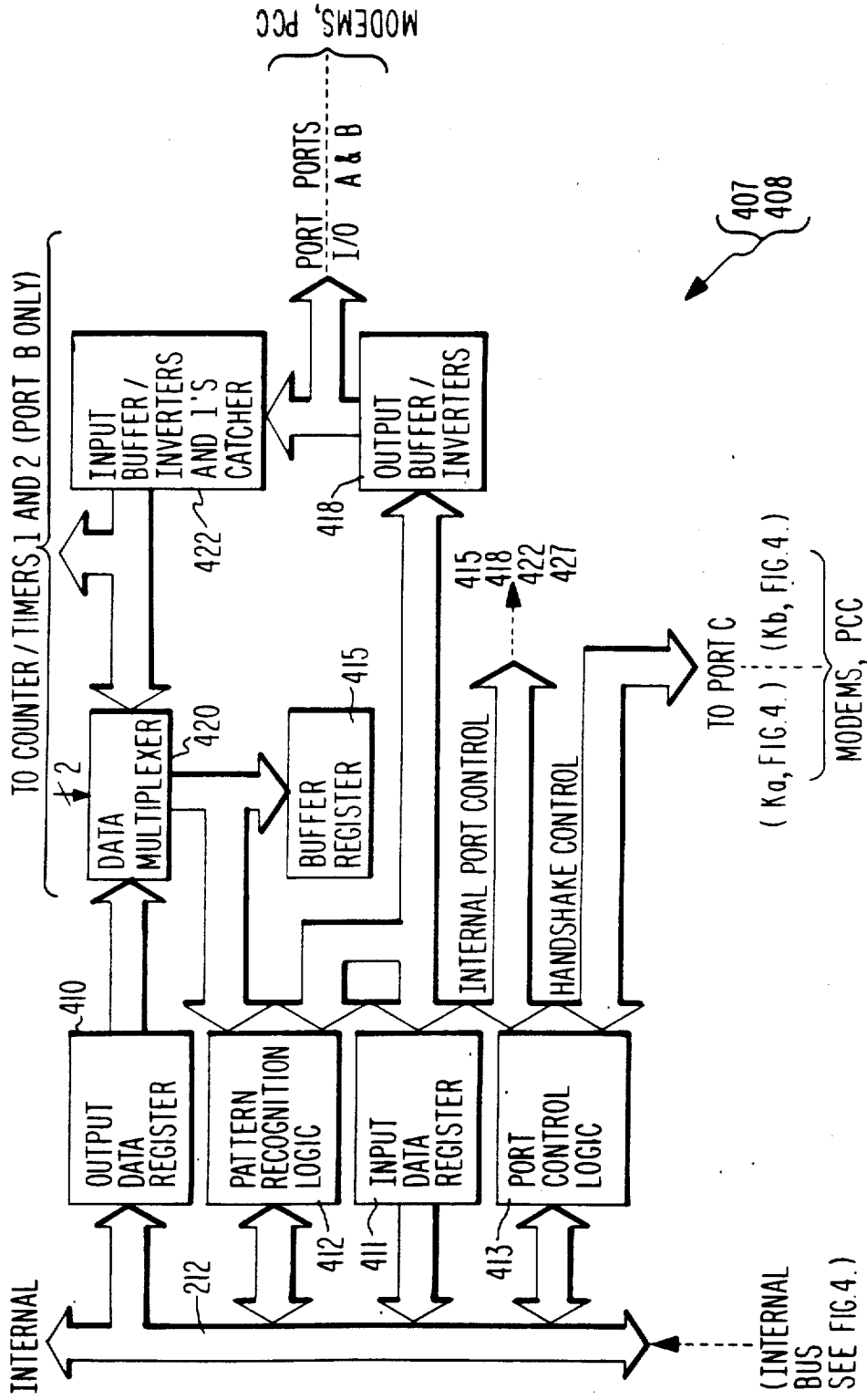
FIG. 5. CIO PORTS A AND B BLOCK DIAGRAM.  PRIOR ART

CIO PORT C BLOCK DIAGRAM.

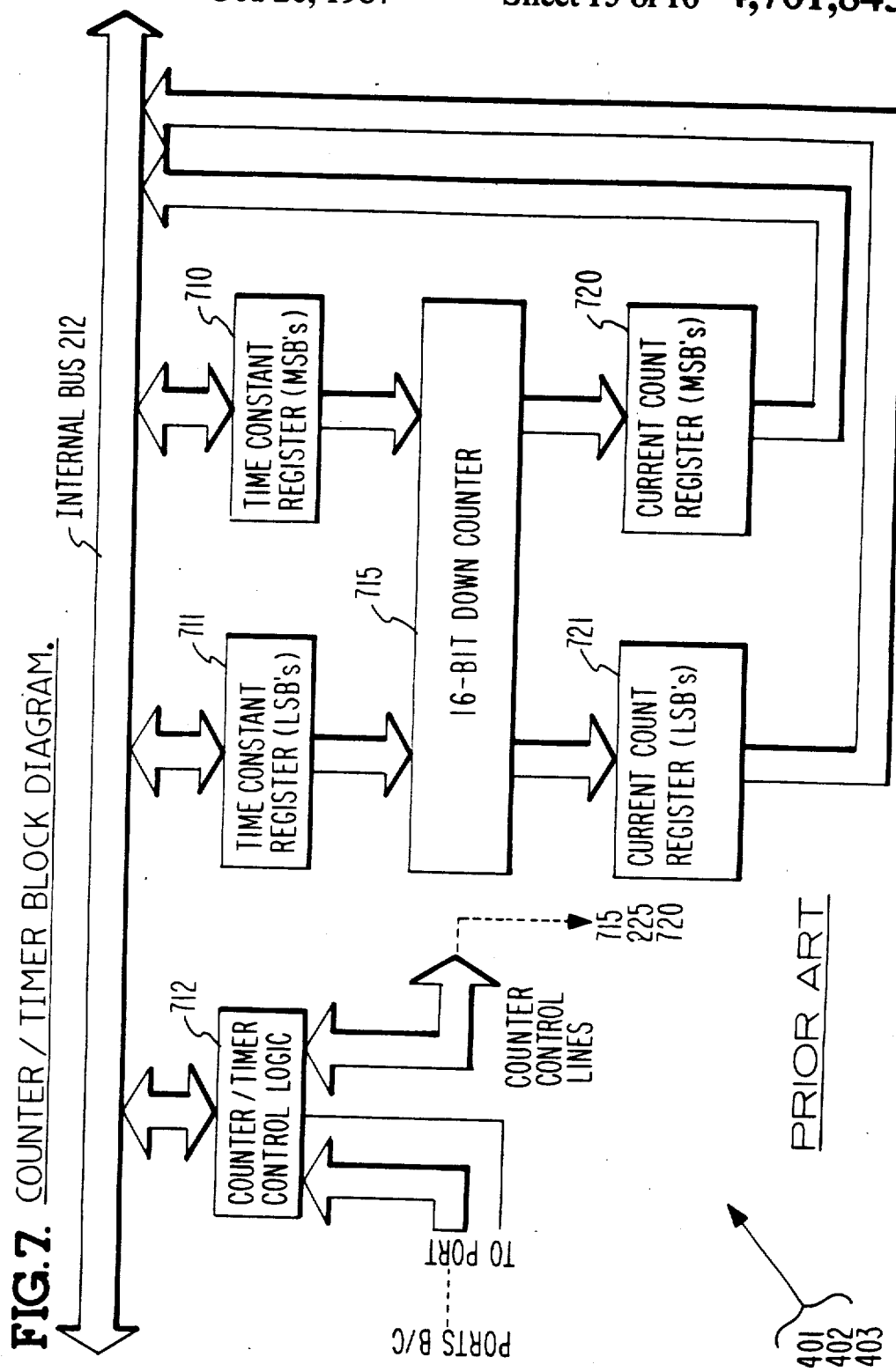
FIG.7. COUNTER/TIMER BLOCK DIAGRAM.   PRIOR ART

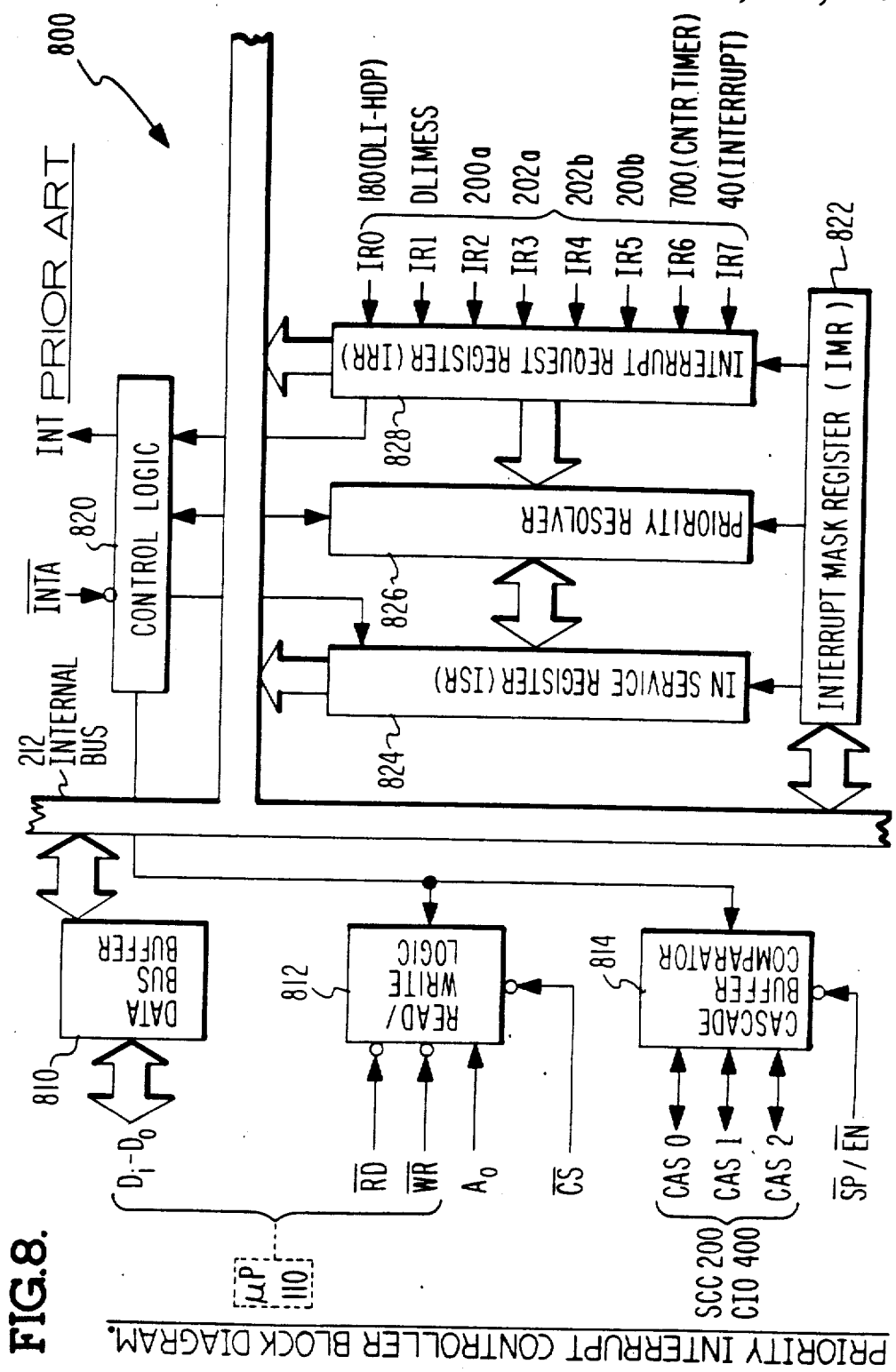
FIG.8. PRIORITY INTERRUPT CONTROLLER BLOCK DIAGRAM.

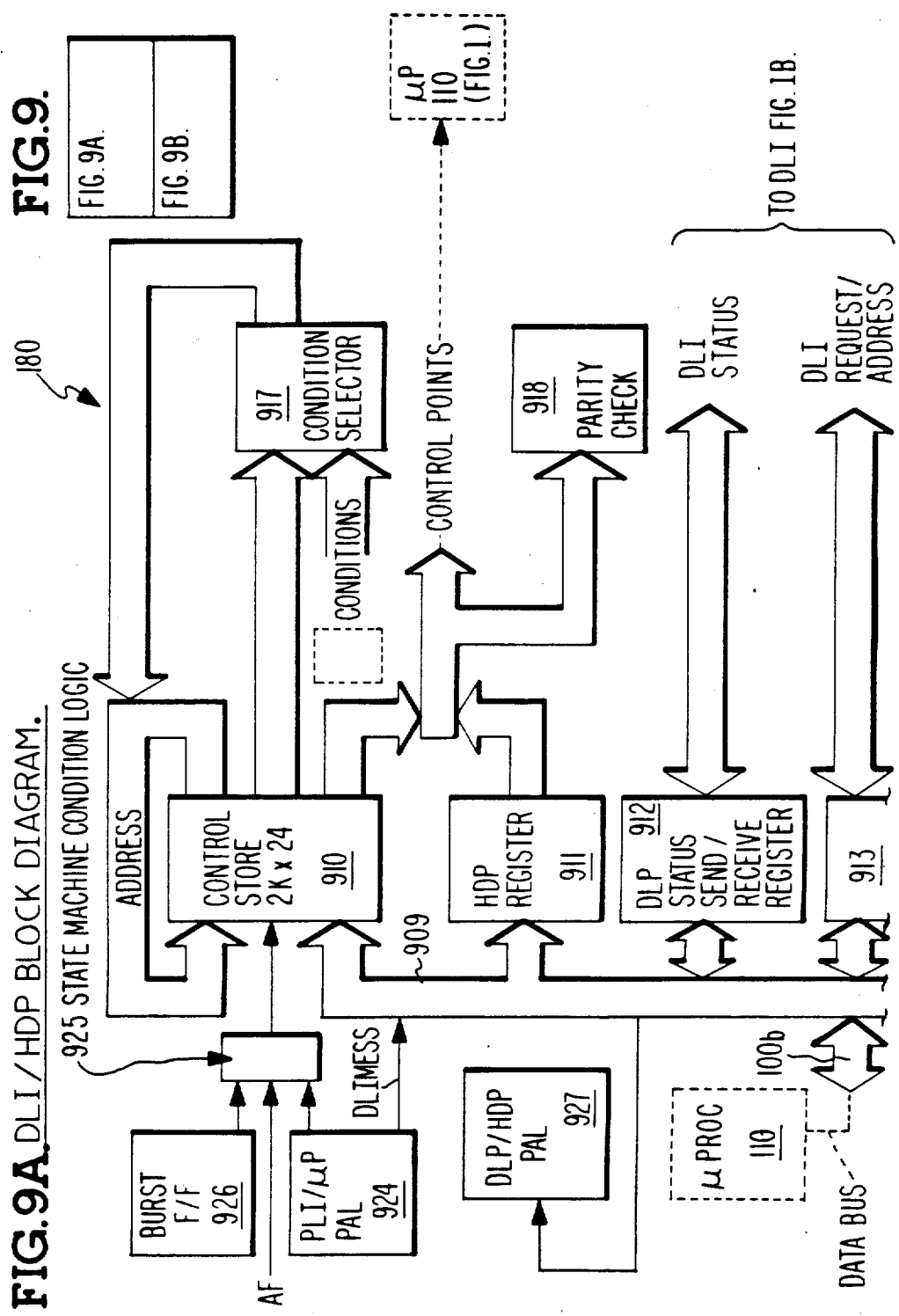
FIG. 9A. DLI/HDP BLOCK DIAGRAM.

4,701,845

USER INTERFACE PROCESSOR FOR COMPUTER NETWORK WITH MAINTENANCE AND PROGRAMMABLE INTERRUPT CAPABILITY

FIELD OF THE INVENTION

This disclosure relates to the area of computer networks and to specialized processors which operate a maintenance subsystem for the network.

CROSS REFERENCES TO RELATED APPLICATIONS

This application is related to a copending application entitled "Maintenance Subsystem For Computer Network", U.S. Ser. No. 664,670, filed Oct. 25, 1984, by inventor David Andrew Andreasen, et al.

BACKGROUND OF THE INVENTION

In the design and development of computer system networks, there are many considerations and trade-offs which must be balanced in order to provide an optimum system and to decide what limits must be drawn in terms of economic factors, size and space factors and versatility of control of the system.

The presently described computer network system is designed not only to be used with a variety of peripheral type devices but also with data comm and telephone lines to remote terminals to provide rapid transference of data between the units and rapid data processing by a central processing unit in a fashion whereby reliability is maintained to a very high degree.

The system is organized so that each of the various elements and units will, when initiated, provide its own self-test routines and report the results and information to a maintenance processor called the User Interface Processor 100. This processor works in conjunction with the various remote terminals, and the various types of peripheral devices through an I/O subsystem which is uniquely designed to handle units called "data link processors". These types of data link processing units were described in their earlier versions in U.S. Pat. Nos. 4,415,986; 4,392,207; 4,313,162; 4,390,964 and 4,386,415.

The maintenance subsystem involved herein is so interconnected to the various elements of the system that self-test data may be collected and transported to a remote diagnostic unit which may be a central diagnostic unit for many, many computer networks in many different locations. The remote terminal will perform the basic diagnostic routines to any of the computer networks which have problems and will send messages which pinpoint the specific cause or location of the trouble so that a local operator may correct the fault by changing a card, replacing a module or fixing any other designated fault or outness.

SUMMARY OF THE INVENTION

The User Interface Processor of the present disclosure is a specialized processor known as a maintenance processor which supports a computer system network which involves a central processing unit connected to many remote peripherals through data link processors and other remote terminals via telephone lines.

The User Interface Processor or "maintenance processor" provides an interface to the central host processing unit and to various elements of the network such as the data link processors which connect to remote peripherals, to the operator display terminal which provides visual information and diagnostic information, to external cabinets and to a power control card which enables connection to a remote support center for comprehensive diagnostic and fault-location services.

The User Interface Processor connects to the central host processing unit through a processor interface card and to various peripherals and terminals through a data link interface/host dependent port controller.

A set of serial communication controllers and communication input/output units work together with a set of timers and a priority interrupt controller in order to communicate with the main host processor, both for normal operational purposes and also for maintenance and diagnostic services.

Each one of a series of local computer networks may be locally checked on self-testing procedures and then connected to a remote support center for comprehensive diagnostics in order to locate specific problems within any given computer network system. Many differently located computer system networks may be connected to one remote support center which can service them all on a time shared basis.

BRIEF DESCRIPTION OF THE DRAWINGS

FIG. 1 is made up of two sheets labeled FIG. 1—1 and FIG. 1—2;

FIGS. 1A, 1B, 1C and 1D are system and network drawings showing how the User Interface Processor module connects to other elements of the system network to provide a maintenance subsystem;

FIG. 3 is made up of two sheets designated as FIG. 3A and FIG. 3B;

FIG. 4 is a block diagram of the communications input/output unit elements of the User Interface Processor;

FIG. 5 is a block diagram showing the ports of the communication input/output unit;

FIG. 7 is a block diagram of the counter timers of the communications input/output unit of FIG. 4;

FIG. 8 is a block diagram of the priority interrupt controller (PRITC) of the User Interface Processor;

FIG. 9 is made up of two sheet labeled 9A and 9B;

GENERAL OVERVIEW

The Maintenance Subsystem

Figure 1:
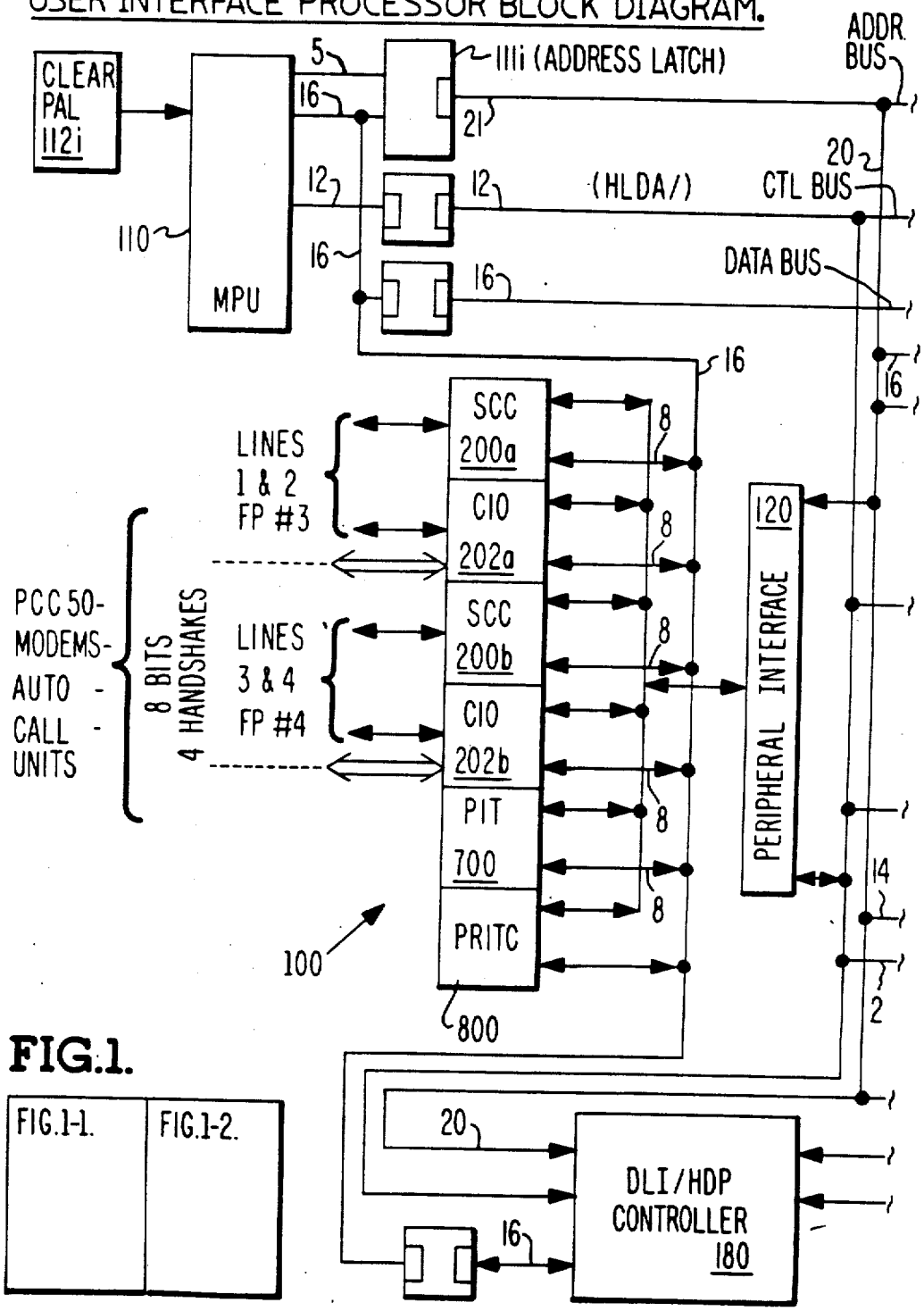
FIG. 1 is a block diagram of the User Interface Processor used in the maintenance system network.

The maintenance subsystem of the computer network is organized around the User Interface Processor 100 which is shown in FIGS. 1A, 1B, 1C and 1D.

As seen in these drawings, the User Interface Processor is connected to all the various elements of the computer system network, that is to say, it connects to the processor interface card and the main host processor on the one hand and, on the other hand, it connects to the power control card, the maintenance card III, the operator display terminals and the various data link proqessors.

Thus, these combinations of elements connected to the User Interface Processor 100 provide the basic operational and maintenance functions for the computer network. For example, the User Interface Processor 100 will initialize and power up the entire computer network system. It will initiate self-testing procedures, whereby each of the interconnected data link processors will do their own self-test, do a check out routine and send the results back to the User Interface Processor. Additionally, the User Interface Processor will connect to the power control card in order to provide maintenance and diagnostic information and data to a remote unit which can then provide further diagnostics which will determine the location of any faulty areas in the system.

Further, the User Interface Processor will initiate its "own self-testing" routines to make sure that it itself is in proper operating condition and it will display the results on the operator display terminal.

Processor Interface Card (PIC)

The processor interface card 40, FIGS. 1A, 1C, in the maintenance subsystem is used to provide the basic system clocks, and in addition it provides data link interface input/output clocks of 8 megahertz. It provides an interface to the processor backplane and also provides a unit called the system event analyzer, $40_e$. Further, the PIC provides 4,000 16-bit words of history trace $40_h$ in order to maintain a history of any selected input signal. Additionally, it provides a 16 K byte memory which holds the error correction bits for the control store in the User Interface Processor.

The Power Control Card (PCC)

The power control card 50, FIG. 1A, will control the power on/off sequencing and detect any DC failures for all power supply modules which are connected directly to the PCC.

The PCC also monitors any air loss and cabinet over temperature in order to provide sensing signals to this effect.

The power control card communicates with the User Interface Processor via an 8-bit parallel bus. It further communicates with any remote device using the RS-232C remote link interface. It can communicate with other power control cards on external basis by using two wire RS-422 direct connect data communication protocol.

The power control card 50 also maintains a battery backup with the time of day function, in addition to providing 256 bytes of non-volatile storage memory. It also provides an automatic restart option after failure of the AC power lines.

DESCRIPTION OF PREFERRED EMBODIMENT

FIG. 1A shows the User Interface Processor 100 as part of a network configuration. The output bus $100_b$ of microprocessor 110 connects to the processor interface card 40 and to the memory bus $30_m$ which connects the main processor 30, FIG. 1B, to the memory control unit 32 and main memory 34.

In FIG. 1A the DRAM 150 provides output to the power control card 50 and the erasable PROMs 150 connect to the operator display terminal $100_t$.

The power control card 50 (FIG. 1A) functions to provide power up-down sequencing; to monitor for power failure, to initiate automatic restart (after power failure); to provide warning of over-temperature; to provide automatic power ON/OFF operation; to provide "remote" power control of external cabinets; to maintain an internal time-of-day clock; and to provide a communication path (data link) for a remote support and diagnostic service.

The processor interface card 40 (FIG. 1A) functions to provide control and data acquisition for diagnostic testing of memory 34 (FIG. 1B), memory control unit 32, host dependent port 500 and the main processor 30; the PIC 40 provides initialization functions such as microcode load, initialization state and clock control, and distribution. The PIC 40 provides a history file, FIG. 1A, for real-time tracing of microcode addresses (break points); it provides 16 general purpose links for tracing of intermittent failures, and it permits performance monitoring so that a trap can be set to count the number of failure occurrences. The PIC 40 supplies a communication path (AULF register, CSCP operator) so that the main system processor 30 can communicate to the UIP 100 for maintenance information on power-off, time of day, reload, etc.

In FIG. 1B the memory bus $30_m$ connects the main processor 30 to the memory control unit (MCU) 32 and to the UIP 100.

Also attached to memory bus $30_m$ is the host dependent port 500 (HDP) which provides a DLI (data link interface) bus $5_d$ to the I/O subsystem $500_s$, and a message level interface (MLI) bus $5_m$ to the I/O expansion module $500_e$ which connects to peripheral devices.

FIG. 1C shows, in greater detail, the UIP 100 connections to the HDP 500 and to the processor interface card (PIC) 40 which interconnect the main processor 30 and the HDP 500.

Figures 1, 2:
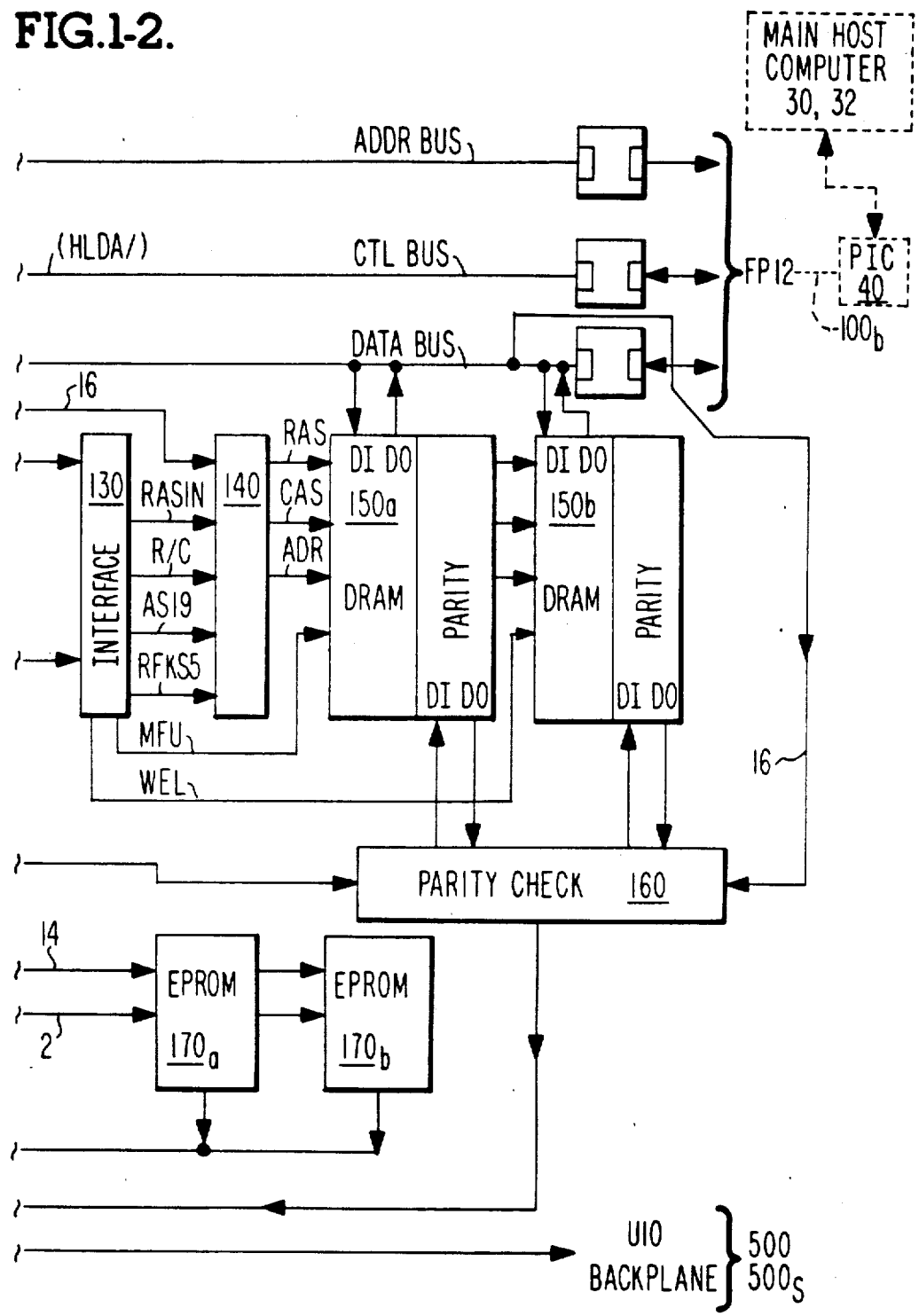
FIG. 2 is a block diagram of the serial communications controller elements of the User Interface Processor.
Figure 1D:
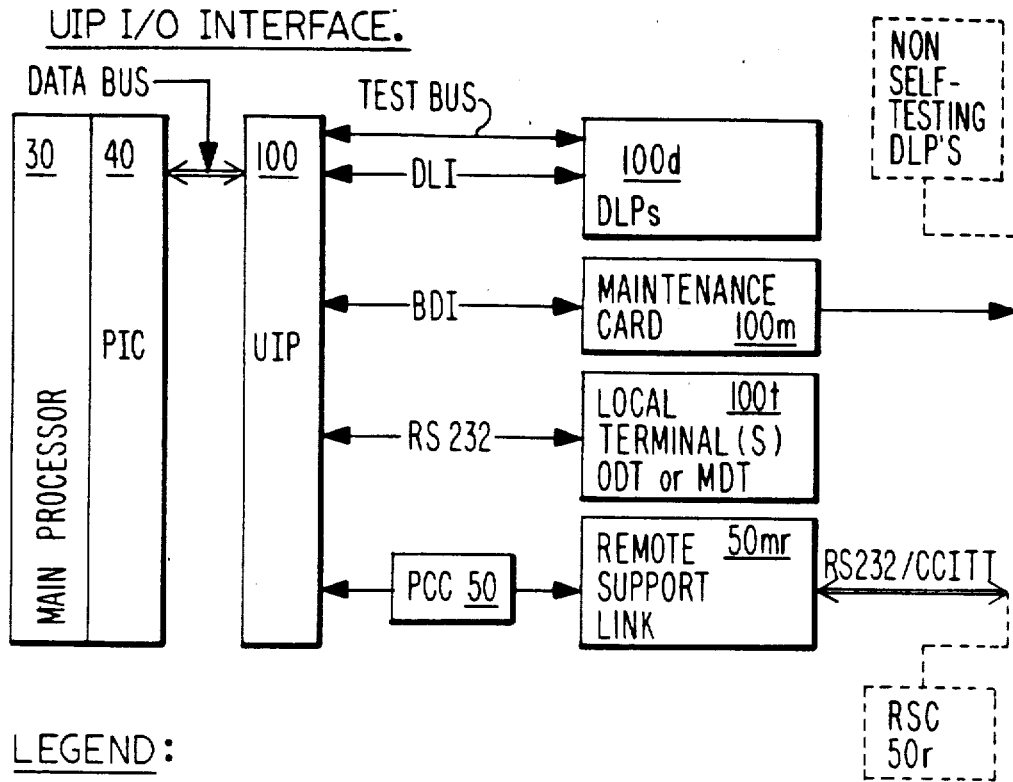

FIG. 1D shows how the UIP 100 connects to the processor interface card 40 and main processor 30 on one side, and to the I/O data link processor $100_d$, to maintenance card $100_m$, and to ODT $100_t$ and remote link $50_{mr}$. The acronym ODT refers to "operator display terminal".

The User Interface Processor 100, FIG. 1, is designated with the acronym "UIP". The User Interface Processor consists of one logic board which can interface to a data link interface (DLI) backplane and also to four independent serial data communications interfaces.

Under certain software instructions, the User Interface Processor 100 can operate as a data link processor (DLP) and in so doing will support a burst rate of up to eight megabytes per second. It can also be used as a host dependent port (HDP) where it will support a burst rate of 50 kilobytes per second. Thus, the same card of hardware can be made to assume different personalities and functions as required.

The User Interface Processor 100 operates on a maintenance philosophy whereby cards in a computer system as FIG. 1A can be isolated and replaced. A combination of "self test" and "peripheral test-driver" tests (PTD) are used to isolate any failure to a replaceable module. This is done by indicating to the operator (via operator display terminal, ODT, $100_t$) the identity of a failing board after the completion of the self-test.

Thus, the User Interface Processor 100 is basically a microcomputer system which is placed on a single printed circuit board. It includes a number of key components as follows:

(a) a 16 bit central processing unit 110, FIG. 1;
(b) 192 kilobytes of PROM, $170_{a,b}$ (FIG. 1);
(c) up to one-half megabytes of RAM, $150_{a,b}$ of FIG. 1;

(d) programmable input-output ports (202$_a$, 202$_b$);
(e) serial data communication ports (200$_a$, 200$_b$);
(f) a priority interrupt controller, (PRITC 800);
(g) programmable timers, (PIT 700);
(h) a DLI-HDP controller 180 (DLI=Data Link Interface);
(i) a DLI host dependent port (HDP), 500 of FIG. 1B.

The User Interface Processor 100 can communicate via the controller 180 and through the UIO (universal input output) backplane to a host computer using a standard UIO-DLI backplane protocol which conforms to the Burroughs Message Level Interface as described in U.S. Pat. No. 4,074,352 at FIG. 5E, this patent being entitled Modular Block Unit for Input-Output Subsystem.

The User Interface Processor is capable of simulating a DLI host dependent port, thus enabling it to communicate with data link processors in a common base that does not have a "distribution card". It emulates the priorly used Distribution Card. The description of data link processors and use of the "distribution card" have been described in U.S. Pat. Nos. 4,313,162 entitled I/O Subsystem Using Data Link Processors, and 4,390,964 entitled Input/Output Subsystem Using Card-Reader Peripheral Controller.

The User Interface Processor includes a backplane interface to a bus known as the backplane maintenance bus. These backplane lines can be used to initiate a data link processor self-test routine and to read a result of that self-test as it is driven on to the backplane from a given data link processor.

In this disclosure, the two above-mentioned user interface processor ports will be referred to as the DLP and the HDP respectively.

The User Interface Processor 100, FIG. 1, is a microprocessor controlled system that contains:
 (i) a microcomputer subsystem (110);
 (ii) a data link interface controller (180);
 (iii) a host dependent port controller (180);

These three units allow the User Interface Processor to communicate with the host computer (30, 32, 34), FIG. 1B, via the DLI controller 180 (FIG. 1) and also with other data link processors 100$_d$, FIG. 1D, that are connected to the I/O backplane, via the host dependent port 500 of FIG. 1B.

The UIP 100 has certain communication restrictions in this regard. The host dependent port 500 is a DLI (Data Link Interface) controller (180) and as such does not provide a MLI (Message Level Interface), but merely provides a backplane DLI interface. In this regard it cannot be used with a distribution card, path selection module, or base control card as was done in the organization of data link processors which were described in the cited U.S. Pat. Nos. 4,313,162 and 4,390,964, since it provides these functions for itself in firmware. This particular host dependent port 180, FIG. 1, must be used in a base that provides an eight megahertz clock, such as that provided from the maintenance card, 100$_m$ of FIG. 1D.

MICROPROCESSOR SUBSYSTEM

The microcomputer subsystem includes both serial and parallel interfaces that are used to perform data communication operations.

The microprocessor subsystem consists of certain elements as follows:
 (i) a microprocessor 110 (such as Intel 8086);
 (ii) a dynamic RAM of 512K bytes (150$_{a,b}$);
 (iii) a PROM of 192K bytes (EPROM) 170;
 (iv) four serial data communication ports (200$_{a,b}$, 202$_{a,b}$);
 (v) six parallel I/O ports (two units of 407, 408, 409);
 (vi) programmable interval timers (PIT 700);
 (vii) a programmable interrupt controller (PRITC 800).

These elements are shown in FIG. 1 of the drawings.

MICROPROCESSOR 110

The microprocessor 110 is used to drive the User Interface Processor 100 and may constitute an eight megahertz chip designated as the INTEL 8086-2 (iAPX-86/10). This microprocessor chip is described at pages 3-1 through 3-24 in an INTEL publication entitled Microprocessor and Peripheral Handbook - 1983 (Order No. 210844-001) and published by INTEL Literature Dept., 3065 Bowers Avenue, Santa Clara, Ca. 95051.

This processor is a high performance 16-bit CPU which is implemented in HMOS technology and packaged in a 40 pin dual in-line package. This processor is capable of addressing up to one megabyte of memory, as well as 64k of I/O addresses. The 8086 microprocessor is operated in a minimum mode since it is used only in a single-processor environment, and as such it generates its own bus control signals.

DYNAMIC RAM 150

The microprocessor 110 is provided with access to a dynamic RAM array of 128 bytes. The array 150 of FIG. 1-2 is organized as 64×18 bits and it is byte-addressable by the microprocessor 110. The RAM array 150 is controlled by a dynamic RAM controller chip, of which the preferred element is the National DP 8409. This chip is described at pages 350–391 in a publication entitled NS 16000 Data Book, 1983, and published by the National Semiconductor Corp., 2900 Semiconductor Drive, Santa Clara, Ca. 95051.

This chip provides all the necessary multiplexing of the row and column addresses, drivers, and the refresh logic. Since this chip is operated in its fastest mode, there is no wait state required. A "refresh request" is requested every 1.6 microseconds by a refresh counter which, in turn, requests a 8086 hold sequence (in microprocessor 110) to occur. Once the sequence is granted, the RAM controller chip (DP 8409) accesses one row of RAM 150, thus refreshing it.

The duration of this access equals that of a microprocessor memory access cycle, thereby reducing the refresh overhead time to a minimum. With this type of configuration, the memory band width is 3.83 megabytes per second. The memory is refreshed also during a "reset" of the microprocessor 110, thus preventing destruction of the memory contents.

Error detection in the RAM array 150 is accomplished by vertical byte parity via circuit 160, FIG. 1-2. Thus, each 16-bit word of RAM 150 has two parity bits, one for each byte. Whenever a word, or a byte, of a dynamic RAM is accessed, the parity is checked for each byte regardless of whether the operation is a word-cycle or a byte-memory cycle. When such an error occurs, the microprocessor 110 has its non-maskable interrupt set to "true", and the error logging can then be implemented to record the bad address (when such an implementation has been provided in the UIP 100 firmware).

PROM STORAGE MEMORY 170

The storage of firmware for the User Interface Processor 100 is provided by an array of six (8K × 8) PROMs which are arranged in a matrix of 24K × 16. Thus, this results in a 48K byte storage capacity. These PROMs which are used are 8K × 8 erasable, and operate on a single cycle (no-wait). The PROM memory 170 (FIG. 1-2) is mapped into the highest point of the microprocessor memory map. This is because of the fact that the microprocessor 110 resets to this point (which is the hex addresss FFFF0).

SERIAL PORTS

As will be seen in FIG. 1-1, the User Interface Processor 100 uses two chips $200_a$ and $200_b$ which are called serial communication controller chips (SCC). In the preferred embodiment, these chips are those manufactured by the Zilog Corporation whose address is 1315 Dell Avenue, Campbell, Ca. 95008, and described in the publication entitled "Counter/Firmware Technical Manual" as Zilog part Z8530 and published in March 1982 by Zilog Corporation.

The SCC chips $200_a$ and $200_b$ each provide two independent serial full-duplex data communication channels with synchronous/asynchronous data rates of up to one megabit per second. They can provide up to 250k bits per second with FM (frequency-modulation) encoding, and they can provide up to 125k bits per second with NRZI (non-return to zero inverted) encoding.

Figure 3A:
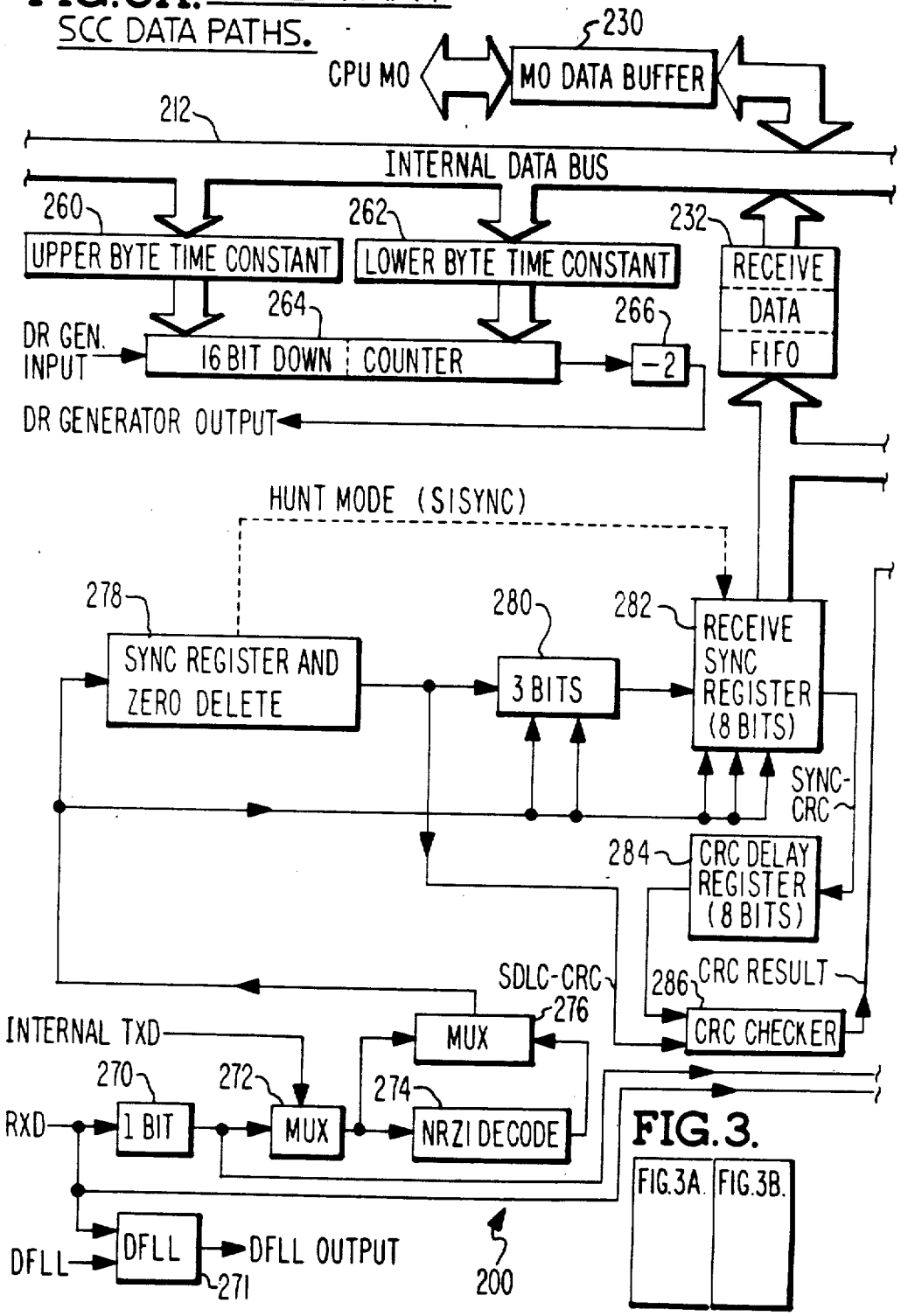
FIG. 3 is a block diagram showing the data paths involved in the serial communications controller.
Figure 3B:
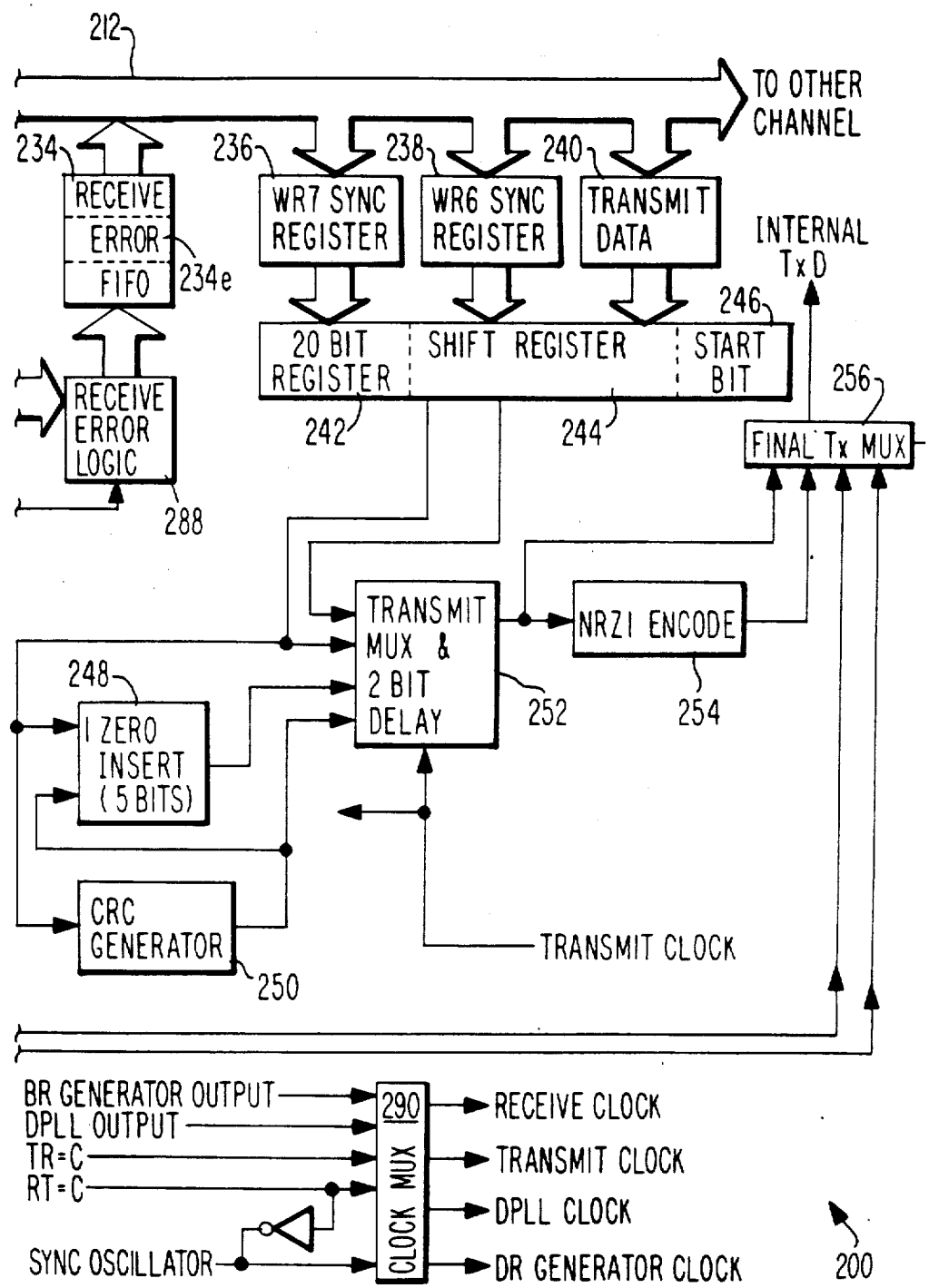

The SCC chip includes two receiver sections 232, 234, FIGS. 3A and 3B, having a three byte FIFO (first in first out register) that allows buffering of four bytes (including the receive data register) of data in the "receive mode". The transmitter section incorporates a single holding register as well as a transmitter data register.

FIG. 2 shows the typical internal features of the Zilog Z8530 SCC (serial communication controller) 200. There are two channels, channel A ($215_a$) and channel B ($215_b$) which connect to remote terminals on serial data lines.

The control signals for these channels are designated as "discrete control and status" for channel A, $217_a$, and for channel B, $217_b$. An internal bus 212 connects these channels and control units to the Baud rate generator A, $210_a$, and also to the Baud rate generator B, $210_b$.

The internal bus 212 also connects the channel A registers $211_a$ and the channel B registers $211_b$, together with further connections to internal control logic 220 and interrupt control logic 222, which then connect to the CPU bus input-output unit 224.

The serial communication controller 200 is an operable part of the User Interface Processor 100 for use as an "interrupt control device". It is capable of driving a programmable interrupt vector in response to a microprocessor interrupt acknowledge signal.

The use (in FIG. 1-1) of the priority interrupt (PRITC 800) controller's cascade output allows the SCC 200 to be operable as a slave interrupt controller. This usage allows implementation of the SCC 200 vectored interrupt capability. While the serial communication controller chip has an "interrupt priority option", it is not used in the User Interface Processor, since this function is allowed for in the interrupt control logic device 222 of FIG. 2.

By using two of the serial communication controller chips, this results in a total of four serial data communication lines shown in FIG. 1-1 as lines 1 and 2 and lines 3 and 4. These four lines are interfaced over to two external four plane connectors which allow the use of existing data communication paddle cards in order to provide the electrical interfaces for use with interfaces such as the RS-232C, or the TDI and so on.

The serial communication controller 200 has certain capabilities which will be described hereinbelow.

(1) Asynchronous Capabilities of SCC 5, 6, 7, or 8 bits per character
1, 1 ½, or 2 stop bits
Odd or even parity
Times 1, 16, 32, or 64 clock modes
Break generation and detection
Parity, overrun, and framing error detection (2) Byte-Oriented Synchronous Capabilities of the SCC Internal or external character synchronization
1 or 2 sync characters in separate registers
Automatic sync character insertion and deletion
Cyclic redundancy check (CRC) generation/detection
6 or 8 bit sync character (3) SDLC/HDLC Capabilities of the SCC Abort sequence generation and checking
Automatic zero insertion and deletion
Automatic flag insertion between messages
Address field recognition
I-field residue handling
CRC generation/detection
SDL loop mode with EDP recognition/loop entry and exit (4) Further SCC Capabilities:

NRZ, NRZI, also FM encoding
Baud rate generator for each channel
Digital phase-locked loop for synchronous clock recovery period

SCC Register Functions

All the modes of communication used are established by the bit values of the Write registers 236, 238, FIG. 3B.

As data is received or transmitted, the Read register ($211_{a,b}$) values change. The values of these Read status registers can promote software action for further register changes.

Referring to FIG. 2 of the serial communication controller 200 block diagram, the register set ($211_a$ and $211_b$) for each channel (A and B) includes 14 Write registers and seven Read registers. Ten of the Write registers are used for control, two are used for sync character generation, and two are used for Baud rate generation. The remaining two Write registers are shared by both channels; one is used as the "interrupt vector" and one is used as the "master interrupt control". Five Read registers indicate the "status" functions, and two are used by the Baud rate generator $210_a$, $210_b$; one is used for the "interrupt vector", one is used for the receiver buffer, and one is used for reading the interrupt pending bits.

SCC Transmitter:

The transmitter section 240 of the serial communication controller 200 is shown in FIG. 3B.

The transmitter section of the SCC has an eight bit "transmit data register" 240 which is loaded from the internal data bus 212 (FIGS. 2, 3) and also has a "transmit shift register" 244 which is loaded from either the sync character or the address register 238 (WR6), the sync character or the SDLC flag register 236 (WR7 of FIG. 3B) or the transmit data register 240.

In the byte oriented modes, the registers WR6 (238) and WR7 (236) of FIG. 3B can be programmed with sync characters.

In the "monosync mode", an eight bit or a six bit sync character is used in WR6, whereas a 15 bit sync character is used in the "bisync mode" in registers WR6 and WR7.

In the bit-oriented modes, the flag contained in register WR7 (236) is loaded into the transmit shift register 244, FIG. 3B, at the beginning and at the end of a message.

If asynchronous data is being processed, then registers WR6 and WR7 of FIG. 3B are not used and the "transmit shift register" 244 is formatted with "start" and "stop" bits shifted out to the transmit multiplexor (252) at the selected clock rate.

Synchronous data (except SDLC/HDLC) is shifted to the CRC (cyclic redundancy checker) generator 250 as well as to the transmit multiplexor 252 at the X1 clock rate.

It should be understood that SDLC means "synchronous data link control" while HDLC is the European version.

The SDLC/HDLC data is shifted, out through the zero insertion logic 248 which is disabled while the flags are being sent. The address bit AO is inserted in all address, control, information, and frame clock fields following the five contiguous "1's" in the data stream. The resultant of the CRC generator 250 for the SDLC data is also routed through the zero insertion logic 248.

SCC Receiver

Referring to FIGS. 3A, 3B, receivers 232, 234 have three eight-bit FIFO buffer registers and an eight-bit shift register. This arrangement creates a three-byte delay time which allows the central processing unit 30, FIG. 1B, time to service an interrupt at the beginning of a block of high speed data.

With each receipt of data in FIFO at 232, 234, FIGS. 3A, 3B an error FIFO 234$_e$ is provided to store parity and framing errors and other types of status information.

In FIG. 3 the incoming data is routed through one of several paths depending on the mode and the character length. In asynchronous mode, the serial data enters the three-bit delay at element 280 if a character length of seven or eight bits is selected. If a character length of five or six bits is selected, then data enters the receive register 232, 234 directly.

In "synchronous" modes, the data path is determined by the phase of the "receive process" currently in operation. A synchronous-receive operation begins with a "hunt" phase in which a bit pattern that matches the programmed sync characters (6, 8 or 16 bits) is searched.

The incoming data then passes through the receive sync register 282 and is compared to a sync character stored in register WR6 (238) or register WR7 (236), depending upon the mode being used.

The "monosync mode" matches the sync characters programmed in register WR7 (236) and the character assembled in the receive sync register (282) in order to establish synchronization.

Synchronization is achieved differently in the "bisync" mode. Incoming data is shifted into the receive shift register 232, 234, while the next eight bits of the message are assembled in the receive sync register 282. If these two characters match the programmed characters in WR6 (238) and in register WR7 (236), the synchronization is established. Incoming data can then bypass the receive sync register 282 and enter the three byte delay 280 directly.

The SDLC mode of operation uses the receive sync register 282 to monitor the receive data stream and to perform zero deletion (278) when necessary, for example, when five continuous "ones" are received, the sixth bit is inspected and deleted from the data stream if it is a zero. The seventh bit is inspected only if the sixth bit equals "one".

If the seventh bit is a zero, a flag sequence has been received and the receiver is synchronized to that particular flag. If the seventh bit is a "one", then an "abort" or an EOP (end of poll) is recognized, depending on the selection of either the normal SDLC mode or the SDLC loop mode.

Thus, for both SDLC modes, the same path is taken by the incoming data. The reformatted data enters the 3 bit delay and is transferred to the receive shift register (232, 234). The SDLC receive operation begins in the hunt phase by attempting to match the assembled character in the receive shift register 232 (232) with the flag pattern in register WR7 (236).

When the flag character is recognized, subsequent data is routed through the same path regardless of the character length. Either the CRC-16 or the CRC-SDLC cyclic redundancy check polynomial can be used for both monosync and the bisync modes, but only the CRC-SDLC polynomial is used for the SDLC operation.

The data path taken for each mode is also different. Bisync protocol is a byte-oriented operation that requires the central processing system (host 30, FIG. 1B) to decide whether or not a data character is to be included in the CRC calculation. An eight bit delay in all synchronous modes, except SDLC, is allowed for this process. In the SDLC mode, all bytes are included in the cyclic redundancy checker calculation.

The User Interface Processor 100 can use the serial communication controller 200 in two different ways. These are: (i) polled; and (ii) interrupt. Both of these require register manipulation during initialization and data transfer. However, when used in the interrupt mode, the SCC 200 can be programmed to use its vectored interrupt protocol for faster and more efficient data transfers.

SCC POLLING

During a polling sequence, the status of the Read register 211$_a$ or 211$_b$, FIG. 2, is examined in each channel. This register indicates whether or not a receive or a transmit data transfer is needed and whether or not any special conditions exist.

This method of I/O transfer avoids interrupts. All interrupt functions must be disabled in order for a device to operate correctly. With no interrupts enabled, this mode of operation must initiate a Read cycle of the Read register "0" to detect an incoming character before jumping to a data-handler routine.

SCC Interrupts

The serial communication controller 200 provides an interrupt capability similar to that of the PIC, priority interrupt controller, 800 of FIG. 1-1 Through the use of this method, an increase in throughput is realized. Whenever the SCC "interrupt pin" is active, then the SCC 200 is ready to transfer data.

The Read and Write registers of FIG. 2 ($211_a$, $211_b$) are programmed so that an interrupt vector points to an interrupt service routine. The interrupt vector can also be modified to indicate various status conditions. Thus, up to eight possible interrupt routines can be referenced.

Transmit, receive, and external status interrupts are the sources of these interrupts. Each interrupt source is enabled under program control with channel A of FIG. 2, having a higher priority than channel B, and with the receive, transmit, and external status interrupts being prioritized within each of the channels.

SCC Baud Rate Generator

The baud rate generator for each channel A and B is shown in FIG. 2 as $210_a$ for channel A and as $210_b$ for channel B. Thus, each channel contains its own programmable baud rate generator. Each generator consists of two eight-bit, time constant registers forming a 16 bit time constant, a 16 bit down counter, and a flip-flop on the output that ensures a squarewave output. This baud generator uses a four megahertz clock derived from the eight megahertz processor clock in order to drive the baud rate generator. Loading the time constant register causes the counter to toggle at the specified X1, X16, X32, or X64 baud rates.

Digital Phase Lock and Loop (DPLL)

Referring to FIGS. 3A, 3B, the serial communication controller 200 is shown to have a DPLL unit 271 which can be used to receive clock information from a data stream with NRZI or FM encoding. NRZI is "non-return to zero, inverted" while "FM" is frequency modulation.

The DPLL 271 of FIG. 3A is driven by a clock which is normally 32 times (NRZI), or which is 16 times (FM) the data rate. The DPLL uses this clock, along with the data stream, to construct a "receive clock" from the data. This clock can then be used as the SCC receive or the SCC transmit clock, or both.

Input-Output Ports

In order to provide access to external interfaces, there are provided, as seen in FIG. 4, a pair of counter timer-parallel input-output ports (CIO). These counter timer ports are provided through the use of a Zilog chip (Z8536) which is described in a Zilog publication entitled "Zilog Tech Manual" and which is manufactured by Zilog Corporation of 7315 Dell Ave., Campbell, Ca. 95008 and which was published in March, 1982.

This CIO or counter input-output port ($202_a$, $202_b$ of FIG. 1-1) is a general purpose I/O port that provides two independent eight-bit, double buffered, bidirectional input-output ports, plus an extra four bit I/O port. These types of ports feature a programmable polarity, and a programmable direction (in the bit mode); they provide "1's" catchers, and programmable open drain outputs.

This CIO device also includes three 16-bit counter-timers, each having three output duty cycles and up to four external access lines. These timers are programmable as being "retriggerable" or as being "non-retriggerable". The CIO 400 of FIG. 4 is capable of pattern recognition and generates an "interrupt" upon recognition of a specific pattern at a port.

As seen in FIG. 4, there are three I/O ports provided by the counter input-output device: Port A(407) and port B(408) are eight-bit general purpose ports, while port C(409) is a four-bit special purpose port. Two port configurations are available and are designated as (i) bit port and (ii) port with hand shake. All three of these ports can be programmed as bit ports; however, only ports A and B are capable of operation as hand shake ports.

Ports A(407) and B(408)

These are the two "general" purpose eight-bit ports, which are identical except that port B(408) can be programmed to provide external access to the counter timers 1 (401) and 2 (402) of FIG. 4. Either port can be programmed to be "hand-shake" driven, as a single or double buffered port (input, output or bidirectional), or as a "control port" with the direction of each bit individually programmable.

Both ports A and B (FIG. 5) include pattern recognition logic 412 which allows interrupt generation when a specific pattern is detected. The pattern recognition logic 412 can be programmed to make the port function like a "priority interrupt controller". The ports A and B can also be linked to a 16 bit input-output port with hand-shake capability.

Each of these ports has 12 control and status registers, which control these capabilities. The data path of each port is made of three internal registers, which are: (i) the input data register 411; (ii) the output data register 410; (iii) and the buffer register 415.

The output data register 410 is accessed by writing to the port data register, while the input data register is accessed by reading the port data register. Two registers (the mode specification register and the "hand shake" specification register) are used to define the mode of the port and to specify which type of handshake, if any, is to be used.

In ports A and B, the reference pattern for the "pattern recognition logic" is specified by the contents of three registers (not shown) which are designated as: (i) the pattern polarity register; (ii) the pattern transition register; and (iii) the pattern mask register. The detailed characteristics of each bit path (for example, the direction of data flow or whether a path is inverting or is non-inverting) are programmed using the data path polarity register, the data direction register and a special I/O control register.

Referring to FIG. 5, there is seen a block diagram of certain details of each of the counter-timer input-output CIO ports A and B. In FIG. 5 there is seen an output data register 410 and an input data register 411 connected to the internal data bus 212. The output data register 410 connects to a data multiplexor 420 which feeds a buffer register 415 having an output which can be conveyed to pattern recognition logic 412 or to input data register 411 or to the output buffer inverters 418. The output buffer inverters 418 can provide an output to the input buffer inverters 422 which can provide their outputs to the data multiplexor 420 or to the counter-timers 1 and 2 of port B (408, FIG. 4). The port control logic 413 of FIG. 5 can provide internal port control or hand-shake control while communicating with the internal data bus 212.

For each port, the primary control and status bits are grouped in a single register called the "command and status register". Once the port has been programmed, this is the only register that is accessed for the most part. To facilitate initialization, the port control logic 413 is designed so that registers associated with a non-needed or unrequired capability are ignored and do not have to be programmed. The block diagram of FIG. 5 is illustrative of the port configuration which is used and it applies both to port A and port B (407 and 408, FIG. 4).

Figure 6:
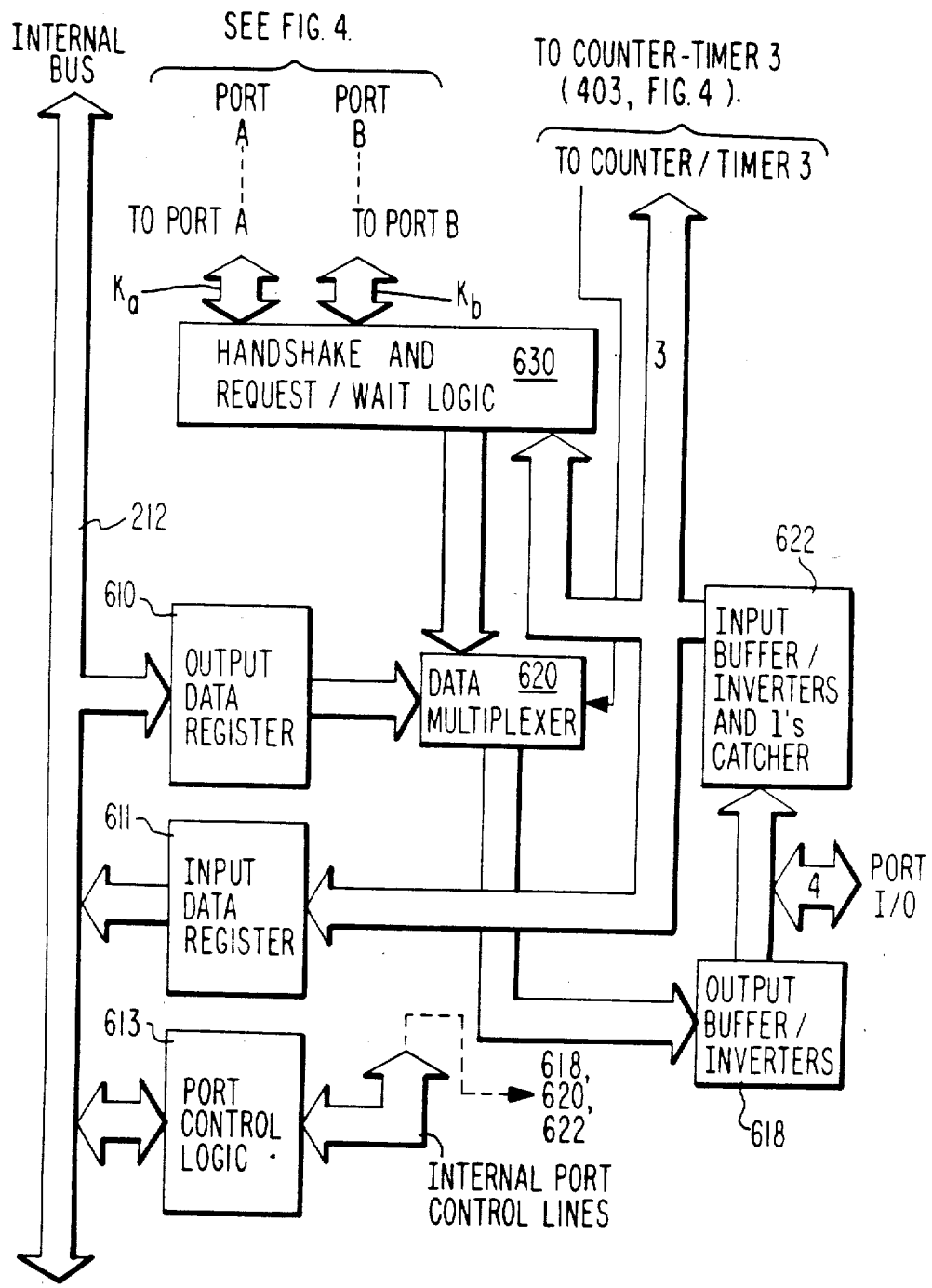
FIG. 6 is a block diagram of the communications input/output port designated as port C.

Port C(409) of FIG. 6

In FIG. 6 there is included a special purpose "four bit register" residing in port C(409, FIG. 4). The function of this register depends upon the functions of ports A(407) and B(408). Port C(409) provides the handshake lines when required by the other two ports. A "request/wait" line can also be provided by port C(409) so that transfers by ports A(407) and B(408) can be synchronized with direct memory access units or central processing units CPU 30, FIG. 1B. Any bits of port C(409) which are not used as hand-shake lines can be used as input-output lines or as external access lines to the counter timer 3 (403 of FIG. 4.)

Since the port C's function is defined primarily by ports A and B (in addition to the internal input data and output data registers, which are similarly accessed as in ports A and B), here only the three bit-path registers are needed, that is the data path polarity register, the data direction register, and the special I/O control register (not shown).

Counter/Timers Input-Output Unit

In FIG. 4 the three counter/timers 401, 402, 403 in the CIO 400 are all identical type units. Each is made of a 16 bit down counter, a 16 bit time-constant register (which holds the value loaded into the down counter), a 16 bit current-count register which is used to read the contents of the down counter, and two eight-bit registers for control and status (that is, the mode specification, and the counter/timer command and status registers).

Up to four "port pins" (counter input, gate input, trigger input, and counter/timer output) can be used as dedicated external access lines for each counter/timer (FIG. 4). There are three different counter/timer output duty cycles which are available. These are: (i) pulse duty cycle; (ii) one-shot duty cycle; and (iii) a squarewave duty cycle. The operation of the counter/timers can be programmed as either retriggerable or as non-retriggerable.

As seen in FIG. 7, each counter/timer connects to the internal data bus 212 and has two time constant registers, 710 and 711, which connect a 16-bit down counter 715, having outputs to the current count registers, 720 and 721. In addition, there is a counter/timer control logic unit 712 which has input lines from a port and which connects to the internal bus 212.

Interrupt Control Logic For CIO (Counter/Timer Input Output Unit

The microprocessor 110 of FIG. 1—1 can receive interrupt signals from the CIO 400 (FIG. 4) interrupt control logic 222. The interrupt control logic of the CIO 400 provides for five registers (not shown) which are:

(i) the master interrupt control register;
(ii) the current vector register;
(iii), (iv) and (v) the three interrupt vector registers associated with the interrupt logic.

In addition, each port and counter/timer command and status register includes three bits associated with the interrupt logic—these are the "interrupt pending", the "interrupt under service" and the "interrupt enable". One interrupt per counter/timer input-output unit drives a priority interrupt controller (800, FIG. 1) input with the interrupt controller programmed to recognize the CIO 400 as a slave interrupt controller. Similar to operation of the SCC 200, this implementation allows the full use of the CIO 400 interrupt vector capabilities.

Programmable Interval Timers (PIT)

As seen in FIG. 1—1, the User Interface Processor includes a PIT 700 or programmable interval timers. These incorporate three counter/timers which are used as interval timers. Each device is an eight megahertz programmable interval timer that consists of an I/O accessible set of three 16-bit counter/timers. These timers operate functionally similar to the three counters in the CIO 400. Two outputs of the PIT 700 timers are "ORed" together and drive an interrupt level to the priority interrupt controller PRITC 800 of FIG. 1—1.

The individual outputs of these two timers are also routed to the CIO 400, FIG. 4, so that the microprocessor 110 of FIG. 1—1 can determine (via a read from the CIO port) which timer caused the interrupt. The other timer also directly drives the programmable priority interrupt controller, PRITC 800, via a different interrupt level.

The PIT 700 (FIG. 1—1, programmable interval timer) has six different modes of operation which may be described as follows:
Output on terminal count;
A hardware retriggerable one-shot;
A rate generator;
A squarewave generator;
A software triggerable strobe;
A hardware triggered strobe.

Programmable Priority Interrupt Controller 800

In FIGS. 1 and 8 there is seen the PRITC 800 which is designated as the Programmable Priority Interrupt Controller. In order to accommodate the multiple interrupts provided on the User Interface Processor, this interrupt controller device 800 is incorporated.

The Programmable Priority Interrupt Controller is capable of handling eight possible interrupts and for generating a priority for each interrupt as well as an individual vector for each interrupt.

Various components of the User Interface Processor 100 can provide an interrupt signal to the microprocessor 110. These various types of interrupts are as follows:
(a) SCC 1 interrupt;
(b) SCC 2 interrupt;
(c) CIO 1 interrupt;
(d) CIO 2 interrupt;
(e) Interval timer interrupt (8254) (2 ORed together);
(f) Interval timer interrupt (8254);
(g) Foreplane receive interrupt;
(h) DLI controller interrupt.

These interrupts are given a priority rating and the interrupt controller device 800 will output a vector pointing to a service routine in microprocessor 110 in response to its corresponding interrupt input. The priority is under programmed control and can be used to assign a level of priority to each input. The programmable priority interrupt controller PRITC 800 is shown in block diagram form in FIG. 8.

The block diagram of FIG. 8 shows the basic elements of the PRITC 800, that is to say, the priority interrupt controller of the User Interface Processor 100. Here, a data bus buffer 810 connects to the internal bus 212 which has a bidirectional connection to the interrupt mask register 822. The mask register 822 communicates to the in-service register 824, to the priority resolver 826, and to the interrupt request register 828 to provide outputs to the internal bus 212, and also to the control logic 820. The control logic 820 provides outputs to the read/write logic 812 and to the cascade buffer comparator 814.

The counter/timer input-output unit, CIO 400, and the serial communication controller, SCC 200, require a separate "interrupt acknowledge" term for each of the units. Since the microprocessor 110 (8086) drives a common interrupt acknowledge (INTA), there was provided means to implement a method of decoding separate "acknowledge" signals.

The PRITC 800 interrupt controller is programmed to see the CIO 400 and the SCC 200 interrupts as though they were interrupts from another interrupt controller device (called "cascade mode"). This causes the PRITC 800 interrupt controller to output a three-bit field (CAS0-CAS2, FIG. 8) which is unique for each interrupt level programmed as a slave interrupt. These three outputs are decoded and are used as the separate "interrupt acknowledge" required by the SCC 200 and the CIO 400 units. This permits full utilization of the interrupt vectoring capabilities of the SCC and the CIO chips.

The three mentioned cascade outputs (CAS0, CAS1, CAS2, which exit from the cascade buffer 814 of FIG. 8) are also driven to the foreplane (FP) to allow for another external interrupt control chip to be used which can thus increase the amount of interrupts to fifteen types of interrupts.

Foreplane Interface for Microprocessor 110 (FP 2 in FIG. 1

As seen in FIG. 1-2, the User Interface Processor 100 provides a buffered microprocessor interface that is brought to the foreplane connectors (FP 2). This interface allows the UIP 100 to be connected to application dependent logic via this interface. All necessary memory control signals are provided so that logic providing expanded memory can also be implemented. Input-output devices external to the UIP 100 can also be connected. These can be input-output units or units memory-mapped to the UIP 100.

Each interrupt is received by the UIP's programmable priority interrupt controller PRITC 800. More interrupts can be provided by the addition of another controller that uses the UIP interrupt controller cascade outputs (CAS0, 1, 2 of 814 of FIG. 8). This can result in the expansion of up to eight interrupt signals. For devices with very slow access times, a "ready input" (derived from the microprocessor 110) is brought to the foreplane (FP 2) so that these slower components can meet the microprocessor timing constraints.

The microprocessor 110 has an output signal HLDA/which is present on the CTL bus of the foreplane (FP 2 of FIG. 1-2); however, the input signal HOLD is not present. This means that the application dependent logic connected to the foreplane FP 2 cannot, for example, perform direct memory access to the UIP RAM array 150. Further, the buffers which drive some signals on the foreplane are always enabled and they cannot be disabled by either the UIP microprocessor 110 or by the application dependent logic, wwhich may be attached to the foreplane (FP 2, FIG. 1-2).

There are a group of signals brought out to the foreplane connectors FP 2 of the User Interface Processor board. In the signals, the direction is indicated by B for bidirectional; by I for input; and by O for output. The list of signals on the foreplane connectors is as follows:

| | | |
|---|---|---|
| - Microprocessor Address Bus (20 bits) | | O |
| - Microprocessor Data Bus (16 bits) | | B |
| - Interrupt Controller Cascade Bus (3 bits) | | O |
| - Microprocessor Control Signals: | | |
| BHE/ | - Byte High Enable | O |
| RD/ | - Read Strobe | O |
| WR/ | - Write Strobe | O |
| M/IO | - Memory/IO | O |
| DT/R | - Data Transmit/Receive | O |
| ALE | - Address Latch Enable | O |
| DEN/ | - Data Enable | O |
| HLDA | - Hold Acknowledge | O |
| INT | - Interrupt (input to interrupt controller) | I |
| INTA/ | - Interrupt Acknowledge | O |
| RDY | - Ready (wait enable) | I |

Figure 9B:
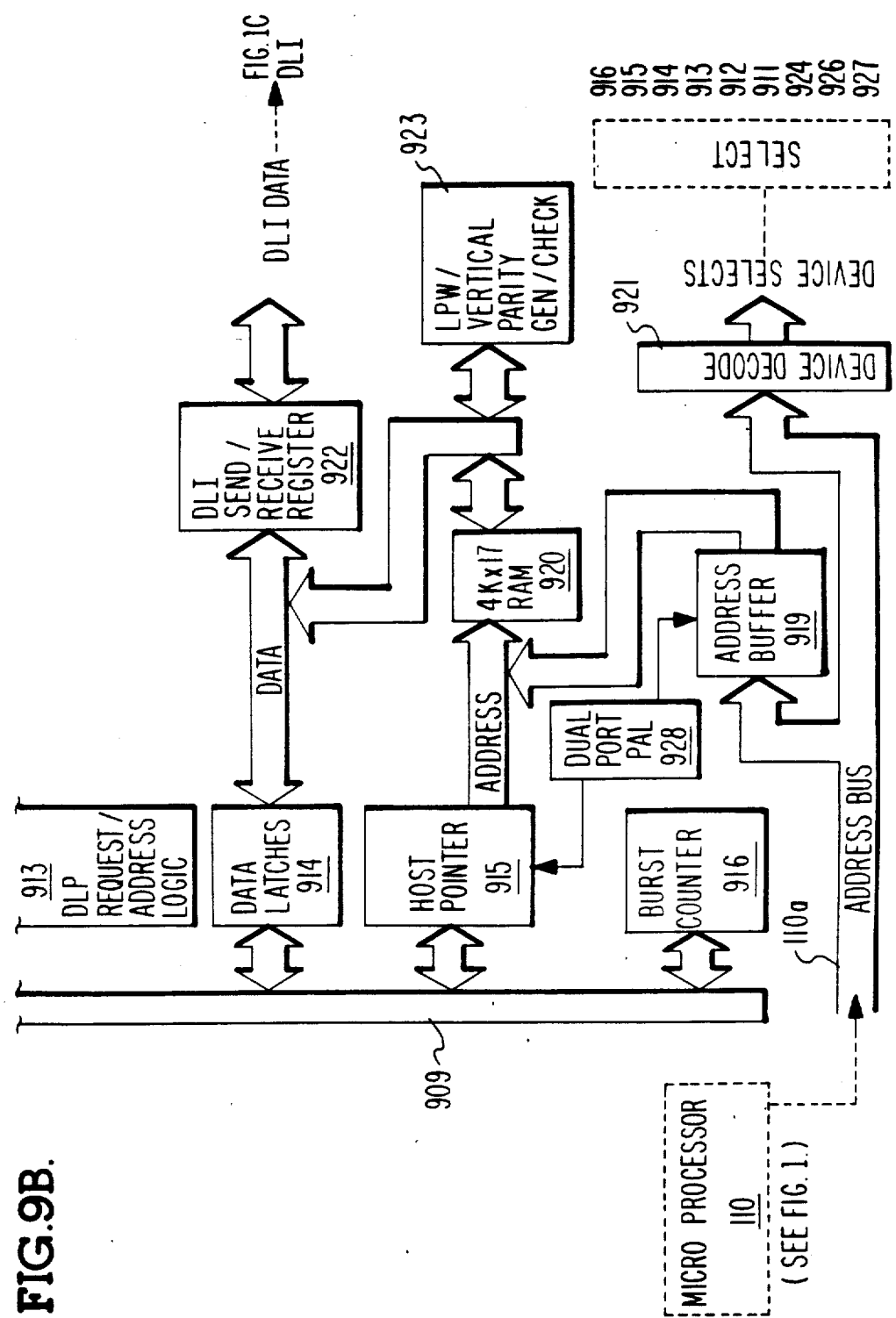
FIG. 9 is a block diagram of the unit designated as the data link interface/host dependent port.

In FIG. 9 (as shown on two sheets as FIGS. 9A and 9B) a block diagram is shown of the DLI/HDP controller. The term "DLI" represents "Data Link Interface" while the term "HDP" represents "Host Dependent Port".

The Data Link Interface (DLI/HDP) Controller

The DLI/HDP controller 180 of FIG. 1 is shown in more detail by the block structure indicated in FIG. 9.

The DLI controller provides an "interface" which consists of the "clear" and "self-test" initiation logic, the DLI send/receive registers 922, a burst counter 916, a burst end logic 926, a longitudinal parity word (LPW) generator 923, vertical parity generation and routing, request and emergency request logic, and DLI/microprocessor communication logic.

A 24 bit state machine (925 and 910) with parity accepts the conditions from and controls these data elements. The microprocessor 110 also accepts status from, and provides control of, portions of these elements.

FIG. 9 also shows a block diagram of the DLI/HDP interface. A data bus 909 connects control store 910, HDP register 911, a DLP status send/receive register 912, a DLP request/address logic 913, data latches 914, host pointer 915 and burst counter 916. The control store 910 has outputs which provide signals to a condition selector 917 and to a parity check circuit 918.

The data latches 914 have a data bus connection to the DLI send/receive register 922. The host pointer 915 provides addresses to RAM 920 which is connected to a vertical parity generator checker 923.

The microprocessor address bus 110a connects to an address buffer 919 and a device decoder 921.

Clear/Self-Test Initiation

The "clear" and "self-test" initialization logic (112$_i$, FIG. 1) detects when various types of clear signals and self-test signals are required. Clear signals detected by the clear/self-test PAL 112$_i$, FIG. 1—1 (Programmable Array Logic) are as follows:

LCLCLR—Local clear
MSTRCLR—Master clear
SELCLR—Select clear
PUPCLR—Power Up clear
PSSCLG—Path selection module generated clear These signals are received and latched by the Clear self-test PAL 112$_i$ and a non-maskable interrupt is generated by the self test PAL (112$_i$), thus informing the microprocessor 110 that a clear condition has occurred. The microprocessor 110 can then read this PAL (112$_i$) and determine which condition occurred and what action to take as a result.

The Clear self-test PAL (112$_i$) also performs the function of controlling the microprocessor 110 reset signal. The UIP 100 resets and clears for the following listed conditions:

(i) PUPCLR—power up clear;
(ii) A foreplane paddle card - mounted push-button clear;
(iii) Jumper selectable option of selective clear (SELCLR);
(iv) All other clear signals generate the 8086 microprocessor's (110, FIG. 1) non-maskable interrupt.

Incorporated into the clear self-test PAL (112$_i$) is the dynamic RAM parity error signal. This term also generates a non-maskable interrupt and can be read by the microprocessor 110 to determine which clear signal or parity error caused the NMI interrupt.

DLI Send/Receive Registers

In FIG. 9 the DLI send/receive registers 912 and 922 are implemented in two 2917A bidirectional register/latches. The 2917A is a register/latch manufactured by Advanced Micro Devices, Inc. whose address is 901 Thompson Place, P.O. Box 453, Sunnyvale, Ca. 94086, and the 2917A unit is described in Bipolar Microprocessor Logic and Interface Data Book, which was published by Advanced Micro Devices, Inc. in 1981. The "output enable" on to the DLI status bus (FIG. 9) is generated by the signal called "CONNECT" and the signal "IOSND".

This control signal (CONNECT and IOSND) is generated in the request logic 913. The combination of CONNECT and a "DLP request" generates an "output enable" for the DLI buffers 922, thus allowing data to be driven on to the DLI data bus (FIGS. 1C and 9) from a connected data link processor DLP. The microprocessor 110 is also capable of sending "DLP request" as "true" as well as resetting it to "false".

The "latch enable" to receive data from the DLI into the receive register 922 is controlled by the signal AF (synchronized STIOL). The clocking of data into the DLI send register is controlled by the DLI state machine (925 and 910). The use of the term "PAL" will be meant to indicate "Programmable Array Logic".

DLI Burst Counter 916

The burst counter 916 of FIG. 9B is implemented as a PAL programmed as an eight-bit up-counter. It can be read and also loaded by the microprocessor 110, with the count-enable generated by the DLI state machine (910, 925). An overflow term designated BUFFUL is also generated by the burst counter 916 that causes a "burst exit" when the counter overflows.

The burst-end logic 926 uses the signal TERM (terminate), the signal BUFFUL (carry out of the burst counter), and the signal STIOL (strobe I/O level). These signals are used to provide a condition input to the DLI state machine (925, 910) to halt the burst mode, as well as to reset the burst flip-flop 926.

Longitudinal Parity Generation/Checking

The parity check circuit 918 provides a longitudinal parity generator which is implemented in two PALs (923) which are programmed to perform the longitudinal parity word (LPW) accumulation. A data pipelining latch means consists of two latches 914 and 923 which are used to meet the timing requirements on the internal DLI data bus FIG. 9B.

The microprocessor 110 of FIG. 1 controls the clearing and also examines the NEQZERO status from the LPW generator (923). The DLI state machine (910, 925) controls the accumulation and the reading of the longitudinal parity word LPW generator 923. The "pipelining latch enable" (923) is also controlled by the DLI state machine (910, 925).

Vertical Parity Generation Checking

Vertical parity generation and routing are performed by two nine-bit parity generators with a quad 2×1 tristate multiplexor 922. A bidirectional register/latch (2917A) is used to send and receive the parity bit on the DLI data bus (FIG. 1).

Vertical parity is generated and written into the parity RAM 920 when writing into the dual port RAM 920 from the microprocessor system of 110. Vertical parity is checked when writing into the dual port RAM 920 from the DLI interface 922 and the actual DLI parity is written into the parity RAM 920.

Vertical parity is read from the parity RAM when reading into the DLI send/receive registers 922. A flip-flop is used to store the parity checking result and used to produce the vertical parity error status signal (VPERR) to the microprocessor 110. VPERR is a status input which may be read by microprocessor 110.

Request Logic for DLP

Request and emergency request logic is handled in the request PAL 913. The microprocessor 110 controls the sending and removing of the DLP request signal. The request monitors the emergency request input from DLI (FIG. 1C) to remove the UIP request when an emergency request is present from another data link processor on the DLI backplane (FIG. 1C).

The signal IOSND (input-output send) is also generated by the request PAL 913. The signal IOSND is set automatically when the UIP 100 is requesting service and the signal CONNECT is "true". This situation occurs when the UIP 100 is returning a descriptor link to the host computer 30, FIG. 1B. The signal IOSND is also settable by the microprocessor 110.

SYSTEM INITIALIZATION

Reference to FIGS. 1A, 1B, 1C and 1D will indicate the system network connections of the User Interface Processor (UIP 100) and its relationship to the other units in the system network such as the processor interface card 40, the operator display terminal 100$_t$, the power control card 50 and power modules 50$_p$, the modem 50$_m$ and the remote support center 50$_r$, all of which are indicated in FIG. 1A.

In FIG. 1B there is seen further relationships of the User Interface Processor 100 to the host dependent port HDP 500 and the I/O subsystem 500$_s$ and the expansion I/O base 500$_e$ and additionally the connections to the main processor 30, the memory bus 30$_m$ and the memory control unit 32 and memory storage cards 34.

FIG. 1C shows further interconnective relationships of the User Interface Processor 100 to the processor interface card 40, the main host processor 30, the memory control unit 32 and the host dependent port 500.

FIG. 1D shows the interface relationships of the User Interface Processor 100 in relationship to the processor interface card 40 and the main host processor 30 and additionally the relationship to the group of data link processors 100$_d$, to the maintenance card 100$_m$, to the local terminals 100$_t$ and to the power control card 50 and remote support link 50$_{mr}$.

The User Interface Processor 100 plays a significant part in the operation and especially the "initialization" of the system network.

The computer network system shown in FIGS. 1A, 1B, 1C, 1D will "power-on" and initialize in approximately three minutes. When the hardware and software are properly installed in the system, then no operator intervention is required during the "power-on" sequence. The operational functioning of this sequence and ways for handling exception conditions that may occur are discussed hereinbelow.

POWER-ON

There is a power button located in the upper left hand corner of the computer cabinet whereby pressing of this button will initiate either the "power-on" or the "power-off" sequence, depending on the current state of the system. The "power-on" button will connect power to the system's main processor 30 and also to disk-system units which are built into the cabinet. It is required that there be at least one operable in-built disk for the power-on sequence to be completed successfully.

After power is successfully established, the UIP maintenance subsystem will be in control of the system network in order to handle the next phase of the "power-up" sequence.

COMPUTER MAINTENANCE SUBSYSTEM SELF-TEST

The computer maintenance subsystem will first perform a "self-test" in order to verify that its own processing elements and memory are operable. Thus, in FIG. 1A a self-test procedure will be generated to verify the microprocessor 110, the timers 700, the memories EPROM 170 and the DRAM 150 and also the DLI/HDP controller 180. This self-test will take only a few seconds, and if the self-test routine successfully passes all of the participating units, then there will be displayed a "greeting" at the operator's display terminal console 100$_t$ (FIG. 1A).

STARTING SYSTEM INITIALIZATION

In the described computer network this initialization will take an approximate time of three minutes. If the "reading" does not appear on the console display 100$_t$ within a few seconds, then it indicates that the maintenance subsystem is not operable and the following problems are likely to be encountered:

(a) There is no external power being supplied to the console cabinet. It is necessary to restore power and then to press the "power-on" button again.

(b) The "self-test" procedures have encountered a failure. It is necessary again to push the button for "power-off/power-on" another time. Here a repeated failure to display the greeting on the ODT screen 100$_t$ indicates that there are problems in the system hardware or the firmware.

(c) There is some problem that exists in the "connection" from the maintenance subsystem over to the operator's console 100$_t$. Here it is necessary to make sure that the operator's terminal 100$_t$ is properly powered and turned on and also to check that the cable from the computer cabinet to the terminal 100$_t$ is securely plugged into the terminal. After this check is made, it is necessary to press the button for "power-off/power-on" again.

LOADING MAINTENANCE SUBSYSTEM SOFTWARE

It is now necessary that the maintenance subsystem load its own software from a file designated BOOT CODE which code is located on the in-built disk which connects to the User Interface Processor 100 by means of the data link interface line at 5$d$ of FIG. 1B.

If there is no BOOT CODE file which is available, then one must be created for use. Normally, this file would be available and required software loaded in a few seconds, after which the operator can recognize that the BOOT CODE file has been found by observing the messages that will appear briefly on the console display. These messages will appear as follows:

BOOT-DLP xx
BOOT-UNIT xxx
Sector-Address xxxxx

When numbers appear for the BOOT-DLP, BOOT-unit and sector-address, the unit containing the BOOT CODE file has thus then been selected.

In addition, the status line at the bottom of the screen will indicate "loading maintenance software".

FAILURE TO LOAD BOOT CODE

Any failure to load the maintenance software will be displayed on the operator's display screen. The status line at the bottom of the screen will indicate the cause of the failure and will make a request that the operator take some action. Thus, the possible causes of failure will may be displayed are:

(a) BOOT unit was not found;
(b) No BOOT CODE file was found on the input unit xxx.
(c) Input unit xxx was not ready.

As a result of this, the operator will be instructed to specify a valid unit number. The operator must then make sure that the appropriate unit is powered-up and ready to go, after which he can type in the unit number to be used. The maintenance I/O configuration will be displayed on the console to show the operator the set of units found on the last attempt to find or to access the BOOT CODE file.

If the correct unit does not appear in the table, then it is likely that there are problems in the I/O subsystem 500$_s$ of FIG. 1B.

If the unit is in the table, but the BOOT CODE file is not found on the specifying unit, it is then likely that a BOOT CODE file was never created on that particular unit.

Another possibility is that the disk in question has been damaged or corrupted, and the operator should then specify a backup unit if one exists or else he should load the software from the BOOT CODE tape which is also supplied in the described computer network system.

If the "backup" BOOT unit exists, it may be specified as the next unit to try. However, if no BOOT unit has been found, it is then not useful to attempt one of the units already displayed in the I/O configuration table since that list would have already been searched. It is necessary to make sure that the expected BOOT unit is operable, and if not, to take action to bring the BOOT unit to an operable state, after which the operator should retry the operation by specifying the unit number.

It is possible that a BOOT CODE unit may be located but that parity errors are encountered while loading the software. When that situation occurs, the operator will be instructed to specify another BOOT unit. Thus, a backup unit should be specified if there is one in existence and available.

If the software loading consistently fails due to errors in the maintenance subsystem memory, the system must be serviced to replace the failing elements before the "power-on" sequence can be successfully completed.

TAPE LOADING MAINTENANCE SUBSYSTEM SOFTWARE

This procedure for tape loading the maintenance software is necessary only in the event of a catastrophic loss of the BOOT unit (for example, a head crash) or if the computer system has never had its BOOT unit initialized.

If no BOOT code file is available, the maintenance subsystem must be "tape-loaded". This procedure is done by first mounting the BOOT CODE tape on a tape unit visible to the maintenance subsystem and then to specify this unit as the BOOT unit (the screen on the operator's console 100, should then be waiting on the operator to specify it).

The maintenance subsystem will then operate off of the tape unit rather than the disk unit. The tape unit must remain mounted throughout the initialization sequence in order to allow subsequent files to be read. When the MCP (master control program operating system) is finally up and running, the operator must create a BOOT CODE file on an in-built disk and again he must initiate the switch for "power-off/power-on" for the system. The next and all subsequent uses of "power-on" will find and use the BOOT CODE file on the disk and thus the BOOT CODE tape may then be dismounted.

LOADING SYSTEM MICROCODE

The next step is done automatically in the power-on sequence. This step is the loading of the computer system microcode from the BOOT CODE file (or from the tape depending on whether or not the system is being tape loaded).

The "status line" at the bottom of the operator's screen will indicate that state. This loading will take approximately 30 seconds.

If the loading fails, the reason will then be shown on the console of the display unit 100,. If the failure is due to I/O problems on the BOOT unit, then the operator should restart the system by specifying a backup BOOT unit if possible.

If the loading fails because of errors in the control store of the processor 30 (memory into which the system microcode is stored), then the failing elements must be serviced.

SYSTEM CONFIDENCE TEST

After the system microcode is loaded, then a confidence test will be run on the computer network. The tests take about 30 seconds each and indicate that the control store in the processor 30 is properly loaded and that the system processing elements are operable. The system is now ready to BOOT the master control program.

INITIALIZING THE OPERATING SYSTEM

At this point the maintenance subsystem has one more task left to perform in the power-up sequence. Here, it must load a program designated as "SYSTEM/UTILOADER" into the computer system. This program is loaded from the BOOT CODE file and this takes approximately 30 seconds.

Any failure to load the SYSTEM/UITLOADER program may be due to I/O problems with the BOOT unit or certain system problems. In the event of a failure, the cause of the problem will be displayed on the operator's console 100,. Then the operator must take appropriate action by either restarting the "power-on" sequence on a backup BOOT unit or by servicing the failing elements.

MAINTENANCE PHILOSOPHY

Since the requirements for initialization and maintenance in a computer system network are similar, this similarity has been made use of in order to yield a particularly significant cost reduction by sharing the access interface hardware. The sharing of the hardware for initialization and for maintenance allows the reporting of failures either locally or remotely and also permits initialization to occur with only a small functional set of circuitry.

A further advantage of this shared hardware is the high degree of visibility to all of the subsystems within the overall system network. This direct visibility permits excellent analysis for faults and for fault resolution.

The access and viability of the initialization and maintenance functions for the computer network system is provided through the use of the User Interface Processor 100.

The particular computer network system disclosed here is composed of the following items:

The main central processor which includes data cards and control cards;
The memory control unit (MCU);
The host dependent port (HDP);
The data link processors (DLPs).

The "maintenance subsystem" which is basically the maintenance and initialization subsystem of this disclosed computer network is comprised of the following items:

The User Interface Processor 100;
The processor interface card (PIC);
The power control card (PCC).

DIAGNOSTIC REQUIREMENTS

In order for diagnostic routines to occur in the described computer system network there are certain parameters and requirements which are involved. These are:

(a) All diagnostic tests must run both locally and remotely (and they must appear in the same format and accept the same commands);
(b) The diagnostic testing must isolate any system failures down to or at the "card" level;
(c) The diagnostic testing must be usable both to support engineering debug, to support the customer's sites, and for test engineering.

INITIALIZATION REQUIREMENTS

The following elements are required for initialization of the disclosed computer network:
(a) The initialization of the system can be accomplished either from the local site and/or the remote site;
(b) Initialization of a system can be possible without operator intervention of any sort, that is to say, the operator at the local site;
(c) Structural failures (interconnections and line faults) during initialization can be detected before detection can be made of the violation of machine integrity.

DIAGNOSTIC TEST OPERATIONS

The diagnostic program involved in this system has two main functions, first to serve as a confidence test on any well defined subsystem; and second to resolve any failures detected by the confidence routine to the location of a specific card unit.

SELF-TEST

All subsystems which have a microprocessor must be able to perform self-test. For those units which do not have a microprocessor, the diagnostic access hardware for the self-test is provided on each printed circuit board. Self-test is accomplished by connecting with the User Interface Processor 100 which provides the intelligence to drive the test via the processor interface card 40.

SYSTEM TEST:

These tests are developed as diagnostic tests which provide means for dynamic testing at the system level. This dynamic testing incorporates the event analyzer of the processor interface card 40 and the history file of the processor interface card 40.

FAULT TYPES

The fault types to be detected in this system are categorized by the level of the test required to detect the fault, the level of skill required to correct the fault, and the time at which the fault is detected. There are four fault types which are considered for detection in the computer system network.

Fault Type I

These types of faults are faults such as failure to power-up; no response on the console unit (operator display terminal); or failure to resolve an operational problem which arises.

Here there is no diagnostic program which is readily available or there is more than one failure present. The probability is high that the fault is in the core logic circuitry. This type of failure cannot be verified from a remote service center.

Fault Type II

These types of faults are detected at the time of system initialization when a console message is displayed which specifies the logic card and fault. Type II faults are also detected when running diagnostic programs, where the same console message is displayed.

The characteristics of this type of fault are structural failures—stuck at 1, stuck at 0, or short-circuits. Correction of this type of problem merely requires replacing the card (or cards) called out on the Maintenance Display Console.

Fault Type III

Type III failures are detected by a high number of device failures reported in the maintenance log; the failure of the master control program (MCP) to initialize; continuous dumps which are not cleared by a halt-load; and/or an error message displayed by running internal diagnostic (E-mode diagnostics) programs.

The characteristics of this fault type III are: peripheral device failure or a memory unit failure; and a failure which can be verified from a remote service center.

The corrective factors in this type of problem may involve the adjustment of peripheral devices or replacement of logic cards, or both.

Fault Type IV

The examples of this type of fault are a system dump caused by a machine check; or an event trap for capturing data about a particular event.

The characteristics of this type of fault are: a data dependent failure, an intermittent hardware failure or software failure. However, these failures must be such that they can be verified from a remote support center. This type of problem requires high skill for correction. The problem can only be identified in a running system environment or by analysis of dumps.

TESTING LEVELS

The diagnostic tests involved are divided into four levels where each is intended to deal with a particular fault-type. Generally, the execution of a test case depends on the successful execution of the preceding test case unless the tests are used to handle or cover completely independent logic. Each test case is so arranged as to avoid the use of previously untested hardware.

BASIC BOARD TESTS AND SELF-TESTS-LEVEL 1

This type of test is used to gain a minimal level of structural and functional confidence in the hardware involved. Its purpose is to verify the initialization path during system power-up, to serve as a confidence test during debug and later as a manufacturing test. These tests use diagnostic codes running either on the UIP (basic board tests) or the on-board microprocessor state machine (self-tests).

The level 1 tests cover tests involving the main central processor 30, the memory control unit 32, the host dependent port 500, and the processor interface card 40, whereby each of these four units are given a basic board test which is driven by the User Interface Processor 100.

The level 1 tests also cover certain other units which are defined as a "self-test" which is driven by an on-board microprocessor unit. These units which are given the self-test via the microprocessor are the User Interface Processor 100, the power control card 50, the storage module disk-data link processor, the printer tape-data link processor and the data comm data link processor.

MICRO-CODED DIAGNOSTICS - LEVEL 2

These tests are used to obtain a higher level of confidence in main frame hardware by testing the interactions between sub-modules in a controlled environment and are also used as memory sub-unit exercises. These tests are written in OHNE microcode and are run on the central processor 30 at normal clock speed (4 megahertz) with a driver running on the User Interface Processor 100 that controls the execution of test cases and monitors the results. These level 2 tests cover the following items:

(a) the central processor 30;
(b) the memory control unit 32 and the memory storage boards 34;
(c) the host dependent port 500 (FIG. 1B);
(d) the maintenance subsystem which includes the User Interface Processor 100, the processor interface card 40 and the power control card 50.

E-MODE STAND ALONE DIAGNOSTICS - LEVEL 3

The E-mode stand alone diagnostics are NEWP (New Programming Language) compiled E-mode programs that run on top of the normal system microcode. The "E-mode" involves Burroughs stack architecture and is described in a paper entitled "An E-Machine Workbench" by G. Wagnor and J. W. Maine, published by ACM (Association for Computing Machinery) in the proceedings of the 16th annual workshop on Micropro- gramming, Oct. 11-14, 1983. They are used to obtain a higher level of confidence in the main frame hardware by arranging for the testing of the following:

(a) the interaction between sub-modules in a controlled E-mode environment;
(b) the interaction between microcode and hardware;
(c) the system and I/O interfaces not covered in the lower level tests.

These level 3 tests fall into two groups—the processor group and the I/O group.

The processor group tests are designed to test E-mode OPs in an environment where the complexities of the master control program are not involved. Standard test cases are provided that run OPs in singles, pairs and triples. There is also the option to generate test cases using a patched NEWP compiler in order to enable a few engineers to take a failing code from the master control processor environment and run it in a diagnostic environment using the computer network features of "event and history logic" in order to aid the diagnosis, as well as using the extensive debug features which are brought into this particular program.

The I/O group are diagnostic which are designed to test the complete path from the E-mode, through the processor 30 and the host dependent port 500 microcode-hardware, the message level interface/data link interface (MLI/DLI) and the data link processors to the peripheral itself. This is in a relatively simple controlled environment which can use the event and history logic and the extensive debug features of these programs.

INTERACTIVE TESTS - LEVEL 4

The level 4 tests are used to find failures which only occur in a "system environment". After the computer main frame 30 is verified to be functioning properly, the master control program can drive the interactive tests (PTD and SYSTESTS) in order to further diagnose the problem in a master control program environment. Further, the event and history logic can also be used to trap failures that only occur while running the system or while running the application software.

DIAGNOSTIC RESOLUTION AND ERROR HANDLING

When there is an occurrence of an error, the diagnostic system will provide "error messages" indicating which boards have malfunctioned.

At the basic board or at the interactive level, the hardware is tested in separate building blocks with the testing of one block depending on the successful test completion of a preceding block. Thus, the diagnostic test will terminate upon the occurrence of an error within the module under test, but it will continue to run tests on other modules providing that they are not dependent on the previous test in order to further diagnose failures in areas such as the M-bus or the control bus that can potentially affect more than one module.

Upon the occurrence of a recoverable error, for example, data miscompares in a pattern sensitivity test, the diagnostic tests will log all information relating to an error when it occurs and will continue until completion.

DIAGNOSTIC GRADING

The diagnostics are graded by running against a list of faults which can be generated by DDRIVE (program for generating test cases). The number of faults detected by the diagnostic tests can be used to determine the percentage of testing necessary.

MAINTENANCE INTERFACES

There are six maintenance interfaces which will be discussed as follows:

(a) TEST RUNNER - interfaced to maintenance software;
(b) Computer system main frame diagnostic interface;
(c) Computer system I/O diagnostic interface;
(d) Maintenance terminal and operator display terminal functions;
(e) The data link interface (DLI) interface;
(d) User Interface Processor diagnostic capabilities.

TEST RUNNER INTERFACE TO MAINTENANCE SOFTWARE

In order to provide a unified approach, an interface to the diagnostics, an executive program called the "TEST RUNNER" will control the execution, the interface and error logging of all of the off-line diagnostics. The TEST RUNNER is a simple menu driven program which gives unambiguous details of failures at the board level and is designed to complement the overall maintenance philosophy of resolving problems to units which can be replaced.

There are two modes of operation for the TEST RUNNER. First, there is the "automatic mode" which is involved during the system initialization sequence and which runs a subset of the diagnostics. Any critical failure detected during this mode will take the system out of automatic and put into manual initialization mode, where diagnostics can be run to verify or further isolate the problem. Any non-critical failure detected (for example, memory module other than a module or data link processor which is not required for initialization) will be flagged to the operator, but will now allow initialization to be continued.

Secondly, there is the MANUAL or INTERACTIVE MODE. This mode can be entered during system initialization or it will be entered as a result of a critical failure during the automatic mode. This mode allows the specification of which diagnostics are to be run and it also allows the use of hardware/software screens and event/history logic in order to trap and/or examine the system's state.

COMPUTER SYSTEM MAIN FRAME DIAGNOSTIC INTERFACE

The diagnostic tests for the main processor 30, the memory control unit 32, and the host dependent port 500 are initiated from the User Interface Processor 100. Here, the User Interface Processor functions as follows:
(a) it initializes the computer system network;
(b) it provides for on site and remote service access to the computer system network. This includes the interface to the main central processor 30, and the manipulation of shift chains into the computer network system, and control of the system clocks and event analysis in order to halt the computer system network;
(c) it responds to real time interrupts such as control store parity and super halt interrupts from the computer system;
(d) it provides the software (soft front panel) for the computer system network.

The User Interface Processor hardware and its functionality are discussed in conjunction with FIGS. 1 through 9 of the specification.

COMPUTER SYSTEM INPUT/OUTPUT DIAGNOSTIC INTERFACE

The User Interface Processor 100 is a processor that has a limited input/output capability. The UIP 100 can communicate with peripheral devices that are configured into the system via the data link interface. The User Interface Processor 100 through the power control card 40 provides the link to the remote support center shown as 50, in FIG. 1A. This is to permit remote diagnostic functions.

The User Interface Processor 100 also provides the link to the local terminals for maintenance and for operative display terminal 100, functions. Additionally, the User Interface Processor 100 provides the Test Bus function via the Burroughs direct interface (BDI shown in FIG. 1B and FIG. 1D).

The UIP 100 has the ability to communicate with peripherals in order to provide system maintenance, to load the operator microcode into RAM, to perform diagnostics, to enable remote maintenance and to provide for Halt-Load. The software programs which do this reside on peripheral devices whose data link processors are connected on the data link interface (that is, system maintenance programs that are used by the User Interface Processor 100).

MAINTENANCE TERMINAL AND OPERATOR DISPLAY TERMINAL FUNCTIONS

The UIP communicates with terminals via a TDI link (Terminal Direct Interface). These terminals provide the separate windows to the computer system network. One window occurs when the system is in the "maintenance mode" and the terminal is a maintenance display terminal (MDT). In this mode, the user may access state, may perform system diagnostics, and perform other low level functions. The other window occurs when the system is under master control program (MCP) control. The terminal then is a ODT or operator display terminal. The UIP 100 provides the function of the operator display terminal-data link processor for the system. Up to two operator display terminals may be configured in any one computer system network.

THE DATE LINK INTERFACE

The UIP 100 can communicate with data link processors via the data link interface shown in FIGS. 1B, 1C, and 1D. To the data link processor, the UIP 100 commands will look like commands sent by the host dependent port 500, FIGS. 1C and 1B, that is to say, the User Interface Processor 100 has the ability to control devices connected on to the data link interface.

There are eight available addresses (0–7) for data link processors on the data link interface. The UIP 100 occupies the first address (0) on a data link interface. A printer tape-data link processor occupies one slot, since it is a one-card data link processor and because it is logically considered as two data link processors communicating with two types of peripheral devices.

A SMD-DLP (storage module disk-data link processor) occupies a fourth address on the data link interface. This leaves four addresses available for expansion.

The User Interface Processor 100 can communicate with peripheral devices by sending I/O descriptors to the data link processors and receiving back I/O result descriptors from the data link processors, In order to determine the system configuration, the UIP 100 sends a Test I/O operation to the peripheral devices on the data link interface. From this information a data link interface configuration table can be built.

The computer system network disclosed herein may have several UIO (universal input output) bases. One base includes all of the data link processors and the peripherals on the data link interface. A separate base may also be configured on the message level interface (MLI) port on the HDP 500 as seen in FIGS. 1B and 1C.

The UIP 100 cannot communicate directly with the peripherals on the message level interface. Thus, the software programs and the files that are used by the UIP 100 to perform diagnostics and other maintenance functions must reside on peripherals whose data link processors are on the data link interface.

The power-up of the described computer system network is an automatic sequence of events that does not generally require operator intervention, except in certain specific cases. If the default path is not functional (for example, a system disk is not operational), then other means if bringing up the system are provided. Several options that require operator intervention here are as follows:
(a) operator intervention as required to perform a cold start or a cool start which requires loading an E-mode program (called Loader);
(b) operator intervention is required to determine the configuration of the I/O system on the message link interface—this also requires loading an E-mode program called Utiloader;
(c) using a Halt-Load unit that is not the default halt load unit—this requires intervention on part of the operator as does the loading of alternate operator microcode.

It may be noted that both the Utiloader and the Loader must reside on the peripheral devices which are connected to the data link interface.

USER INTERFACE PROCESSOR DIAGNOSTIC CAPABILITY

The UIP 100 has provision for some diagnostic capabilities for the I/O subsystem. The UIP 100 can determine the configuration on the data link interface, thus to provide a basic interface test. In addition, the UIP 100 can initiate self-test on the storage module disk and the printer-tape data link processors.

Finally, the UIP performs tests on other data link processors that are part of the system configuration via the Burroughs direct interface (BDI), that is, the test bus function.

The UIP 100 (via the PCC 40) also provides the link to the remote support center 50, for remote diagnostics.

While a preferred embodiment of the User Interface Processor and its maintenance subsystem has been described, other equivalent embodiments may be developed within the concepts of this disclosure which are hereinafter defined by the following claims:

What is claimed is:

1. In a computer network having a host computer and input/output (I/O) subsystem connected to peripheral units via data link processors (I/O controllers), a User Interface Processor for support and maintenance operations, and for dual functional operations in data transfers between itself and said host computer and between itself and said data link processors via a host dependent port (HDP) data link transfer interface, said User Interface Processor operating to initialize and power-up said network and operating to initiate self-testing procedures for purposes of confirming system integrity and locating any faults, said user interface processor comprising:
   (a) a microprocessor subsystem including:
      (a1) microprocessor means for executing instructions and maintenance data transfer operations, said microprocessor means connected to memory means, to a plurality of serial communication controllers, to a plurality of I/O port means, and to a programmable priority interrupt controller;
      (a2) said memory means including:
         (a2a) programmable read only memory means for storing firmware instruction data;
         (a2b) random access memory means for temporary storage of code for effecting initialization and maintenance routines;
      (a3) said plurality of serial communications controllers providing serial data channels for data communication lines to a first set of external units, said serial communications controllers operable for driving programmable interrupt vectors;
      (a4) said plurality of I/O port means for bidirectional parallel data transfer connections to a second set of external units, at least one of said I/O port means capable of pattern recognition and generation of an interrupt upon recognition of a specific pattern;
      (a5) programmable priority interrupt controller means, connected to said microprocessor means, for receiving and prioritizing interrupt signals from said serial communications controllers, from said I/O port means and from a plurality of programmable interval timers and including:
         (a5a) means to output a vector data signal to said microprocessor means for selecting a service routine dependent on the source of said interrupt signal;
      (a6) said plurality of programmable interval timers for receiving instruction data from said microprocessor means and for providing programmed time-interval signals to said priority interrupt controller means;
   (b) a dual function controller means connected to said microprocessor means, to said serial communications controllers, to said I/O port means, and to said priority interrupt controller means, said dual function controller providing an interface for data transfers via said data link transfer interface and including:
      (b1) means to execute transfer operations as a master via said data link transfer interface to said data link processors, said user interface processor operating to send commands to initiate a data link processor self-test routine; and
      (b2) means to execute data transfer operations to said host computer as a slave of said data link transfer interface, said data transfer being executed as a specifically oriented message level interface protocol to continuously provide maintenance and/or information data transfers between the user interface processor and host computer.

2. The User Interface Processor of claim 1, wherein each of said serial communications controllers provides two independent, serial, full duplex data-comm channels operable with both synchronous and asynchronous protocols.

3. The User Interface Processor of claim 1, wherein each of said serial communications controller operates as a slave interrupt controlled device dependent on priority signals from said priority interrupt controller means.

4. The User Interface Processor of claim 1, wherein each serial communication controller includes:
   (a) transmitter section means including:
      (a1) means to program sync characters in a byte-oriented mode;
      (a2) means to program a 6-bit or 8-bit sync character for a mono-sync mode;
      (a3) means to program a 15-bit sync character in a bi-sync mode;
      (a4) means to program for asynchronous data transmission.

5. The User Interface Processor of claim 4, wherein each serial communications controller includes:
   (a) receiver section means including:
      (a1) register means for buffering at least 3 bytes of incoming data in asynchronous/synchronous mode;
      (a2) means for delaying at least 3 bits of serial data in a synchronous mode.

6. The User Interface Processor of claim 5, wherein said receiver section means includes:
   (a) means to search for and detect incoming bit or byte patterns which match a programmed bit or byte pattern, and to establish a synchronization signal.

7. The User Interface Processor of claim 1, wherein said microprocessor means can set each of said serial communication controllers to operate in a polling mode or an interrupt mode, said microprocessor means including:
   (a) polling means to determine if said serial communication controller requires a receive-data or transmit-data operation and to execute said data transfer operation with no interrupts; and (b) means to determine when receive or transmit operations are required in a serial communications controller by means of said interrupt signals.

8. The User Interface Processor of claim 1, wherein each of said I/O port means includes:
    (a) two 8-bit parallel general purpose ports providing handshake data transfer operations to said second set of external units;
    (b) one 4-bit parallel special purpose port for providing handshake lines for each of said two 8-bit general purpose ports.

9. The User Interface Processor of claim 8, wherein each of said I/O port means includes:
    (a) means to detect when an incoming data pattern matches a pre-programmed pattern;
    (b) means to signal an interrupt to said microprocessor means when said match occurs;
    (c) polling means to determine if said serial communication controller requires a receive data or a transmit data operation, and to execute said data transfer operation with no interrupts;
    (d) means to determine when receive or transmit operations are required in said communication controllers by means of interrupt signals.

10. The User Interface Processor of claim 1, wherein said programmable priority interrupt controller means includes:
    (d) means to receive interrupt signals from said dual function controller.

11. In a computer network having a host computer and plurality of input/output (I/O) subsystem connected to periperal units via data link processors (I/O controllers), a User Interface Processor for interfacing both said I/O subsystem and said host computer via a data link transfer interface (HDP), said User Interface Processor operating to initialize and power-up said network and operating to initiate self-testing procedures for purposes of confirming system integrity and locating any faults, said user interface processor comprising:
    (a) a microprocessor subsystem including:
        (a1) microprocessor means for executing instructions and data transfer operations, said microprocessor means connected to memory means, to a plurality of serial communication controllers, to a plurality of I/O port means, and to a programmable priority interrupt controller;
        (a2) said memory means including:
            (a2a) programmable read only memory means for storing firmware instruction data;
            (a2b) random access memory means for temporary storage of code for effecting initialization and maintenance routines;
        (a3) said plurality of serial communications controllers providing serial data channels for data communication lines to a first set of external units, said serial communications controllers operable for driving programmable interrupt vectors;
        (a4) said plurality of I/O port means for bidirectional parallel data transfer connections to a second set of external units, at least one of said I/O port means capable of pattern recognition and generation of an interrupt upon recognition of a specific pattern;
        (a5) programmable priority interrupt controller means, connected to said microprocessor means, for receiving and prioritizing interrupt signals from said serial comunications controllers and from said I/O port means, and from a plurality of programmable interval timers and including:
            (a5a) means to output a vector data signal to said microprocessor means for selecting a service routine dependent on the source of said interrupt signal;
        (a6) said plurality of programmable interval timers for receiving instruction data from said microprocessor means and for providing programmed time-interval signals to said priority interrupt controller means;
    (b) a dual function controller means connected to said microprocessor means, to said serial communications controllers, to said I/O port means, and to said priority interrupt controller means, said dual function controller providing an interface for data transfers via said data link transfer interface, and including:
        (b1) means to execute data transfer operations as a master via said data link transfer interface to said data link processor said user interface processor operating to send commands to initiate a data link processor self-test routine; and
        (b2) means to execute data transfer operations to said host computer as a slave of said data link interface, said means to execute providing a specifically oriented message level interface protocol to continuously provide maintenance and/or information data transfers between the user interface processor and host computer.

* * * * *